US012598280B2

(12) United States Patent
Hu et al.

(10) Patent No.: US 12,598,280 B2
(45) Date of Patent: Apr. 7, 2026

(54) VIDEO DATA PROCESSING METHOD AND APPARATUS, COMPUTER DEVICE, COMPUTER READABLE STORAGE MEDIUM, AND COMPUTER PROGRAM PRODUCT

(71) Applicant: Tencent Technology (Shenzhen) Company Limited, Shenzhen (CN)

(72) Inventors: Ying Hu, Shenzhen (CN); Shan Liu, San Jose, CA (US)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 198 days.

(21) Appl. No.: 18/389,462

(22) Filed: Nov. 14, 2023

(65) Prior Publication Data
US 2024/0080429 A1     Mar. 7, 2024

Related U.S. Application Data

(63) Continuation of application No. PCT/CN2022/123829, filed on Oct. 8, 2022.

(30) Foreign Application Priority Data

Dec. 3, 2021     (CN) .......................... 202111470639.2

(51) Int. Cl.
*H04N 13/178*          (2018.01)
*H04N 13/111*          (2018.01)
(Continued)

(52) U.S. Cl.
CPC ......... *H04N 13/178* (2018.05); *H04N 13/111* (2018.05); *H04N 13/161* (2018.05); *H04N 13/194* (2018.05); *H04N 13/282* (2018.05)

(58) Field of Classification Search
CPC .. H04N 13/178; H04N 13/111; H04N 13/161; H04N 13/194; H04N 13/282;
(Continued)

(56) References Cited

U.S. PATENT DOCUMENTS

| | | | |
|---|---|---|---|
| 2018/0020201 A1* | 1/2018 | Motta ..................... | G06F 3/012 |
| 2020/0053393 A1* | 2/2020 | Niamut ................ | H04N 19/597 |

(Continued)

FOREIGN PATENT DOCUMENTS

CN          114189697 A          3/2022

OTHER PUBLICATIONS

International Search Report and Written Opinion received for PCT Patent Application No. PCT/CN2022/123829 with English translation, mailed on Dec. 19, 2022, 12 pages.

*Primary Examiner* — Thai Q Tran
*Assistant Examiner* — Stephen R Smith
(74) *Attorney, Agent, or Firm* — ARENTFOX SCHIFF LLP

(57) ABSTRACT

A video data processing method includes generating, based on a spliced texture map and depth map, an encoded video bitstream of a free-view video based on multiple images collected by an ith camera in a camera array. The method further includes obtaining boundary metadata information indicating a scene boundary of the free-view video, and adding the boundary metadata information to a file encapsulation data box, to obtain an extended data box. The method further includes performing encapsulation on the encoded video bitstream and the extended data box to obtain a video media file of the free-view video including the boundary metadata information. The method further includes delivering the video media file to a video client, enabling the video client to determine that the ith camera is (Continued)

a boundary camera, and to render video content in the scene boundary indicated by the boundary metadata information.

20 Claims, 9 Drawing Sheets

(51) Int. Cl.
 *H04N 13/161* (2018.01)
 *H04N 13/194* (2018.01)
 *H04N 13/282* (2018.01)
(58) Field of Classification Search
 CPC ............... H04N 13/243; H04N 19/597; H04N 21/44012; H04N 21/816; H04N 21/21805
 USPC ............................................ 348/43; 382/154
 See application file for complete search history.

(56) References Cited

U.S. PATENT DOCUMENTS

2020/0288103 A1* 9/2020 Sheng ................... H04N 13/268
2022/0264176 A1* 8/2022 Liu ....................... H04N 21/816
2023/0132473 A1* 5/2023 Lee ....................... H04N 13/351
 382/154
2024/0031614 A1* 1/2024 Brandt ............... H04N 21/8456

* cited by examiner

| Texture maps collected by multiple cameras 601 | Depth maps corresponding to texture maps of multiple cameras 602 | Metadata 603 |
|---|---|---|

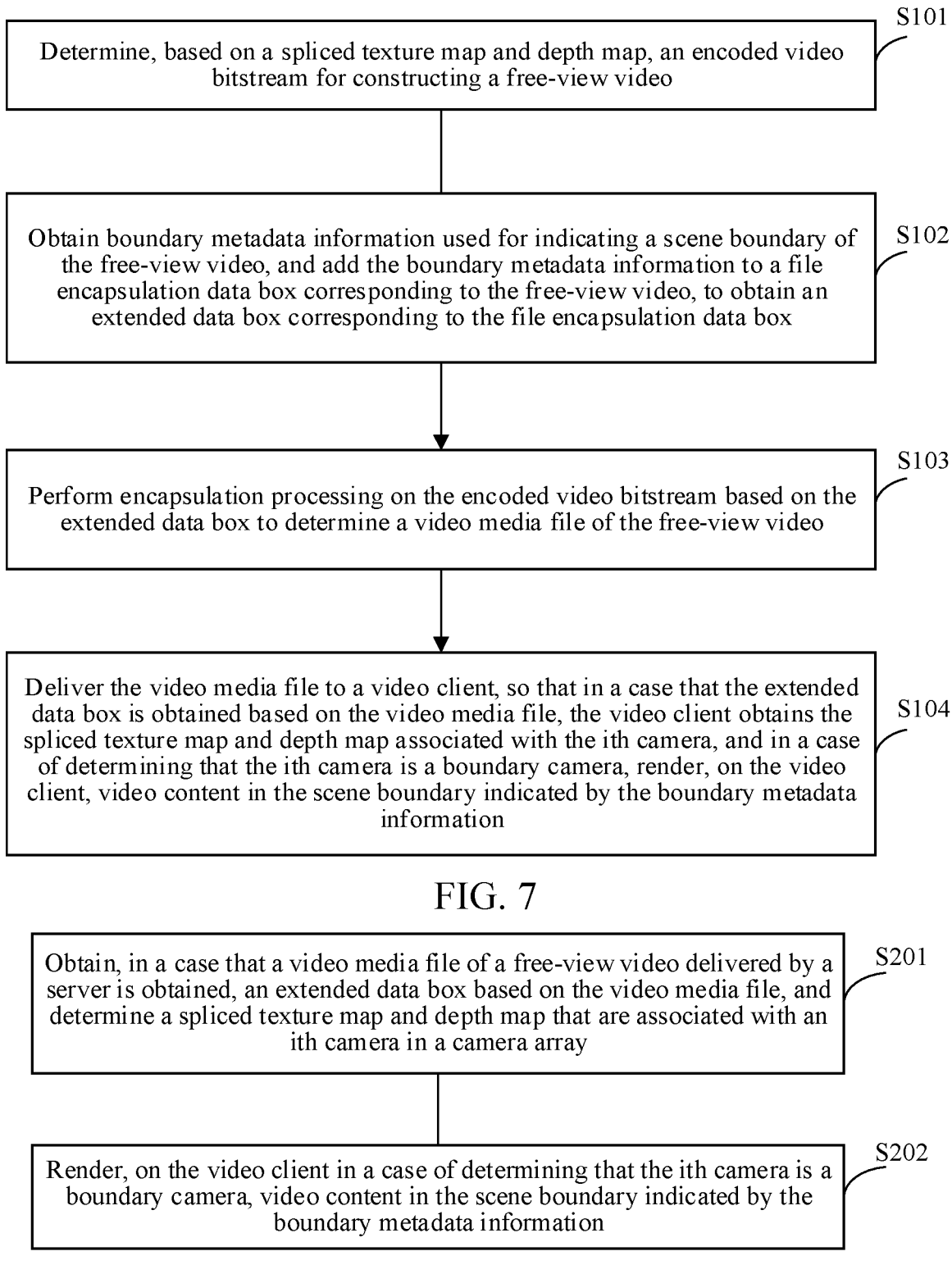

S101

Determine, based on a spliced texture map and depth map, an encoded video bitstream for constructing a free-view video

S102

Obtain boundary metadata information used for indicating a scene boundary of the free-view video, and add the boundary metadata information to a file encapsulation data box corresponding to the free-view video, to obtain an extended data box corresponding to the file encapsulation data box

S103

Perform encapsulation processing on the encoded video bitstream based on the extended data box to determine a video media file of the free-view video

S104

Deliver the video media file to a video client, so that in a case that the extended data box is obtained based on the video media file, the video client obtains the spliced texture map and depth map associated with the ith camera, and in a case of determining that the ith camera is a boundary camera, render, on the video client, video content in the scene boundary indicated by the boundary metadata information

Obtain, in a case that a video media file of a free-view video delivered by a server is obtained, an extended data box based on the video media file, and determine a spliced texture map and depth map that are associated with an ith camera in a camera array

S202

Render, on the video client in a case of determining that the ith camera is a boundary camera, video content in the scene boundary indicated by the boundary metadata information

FIG. 8

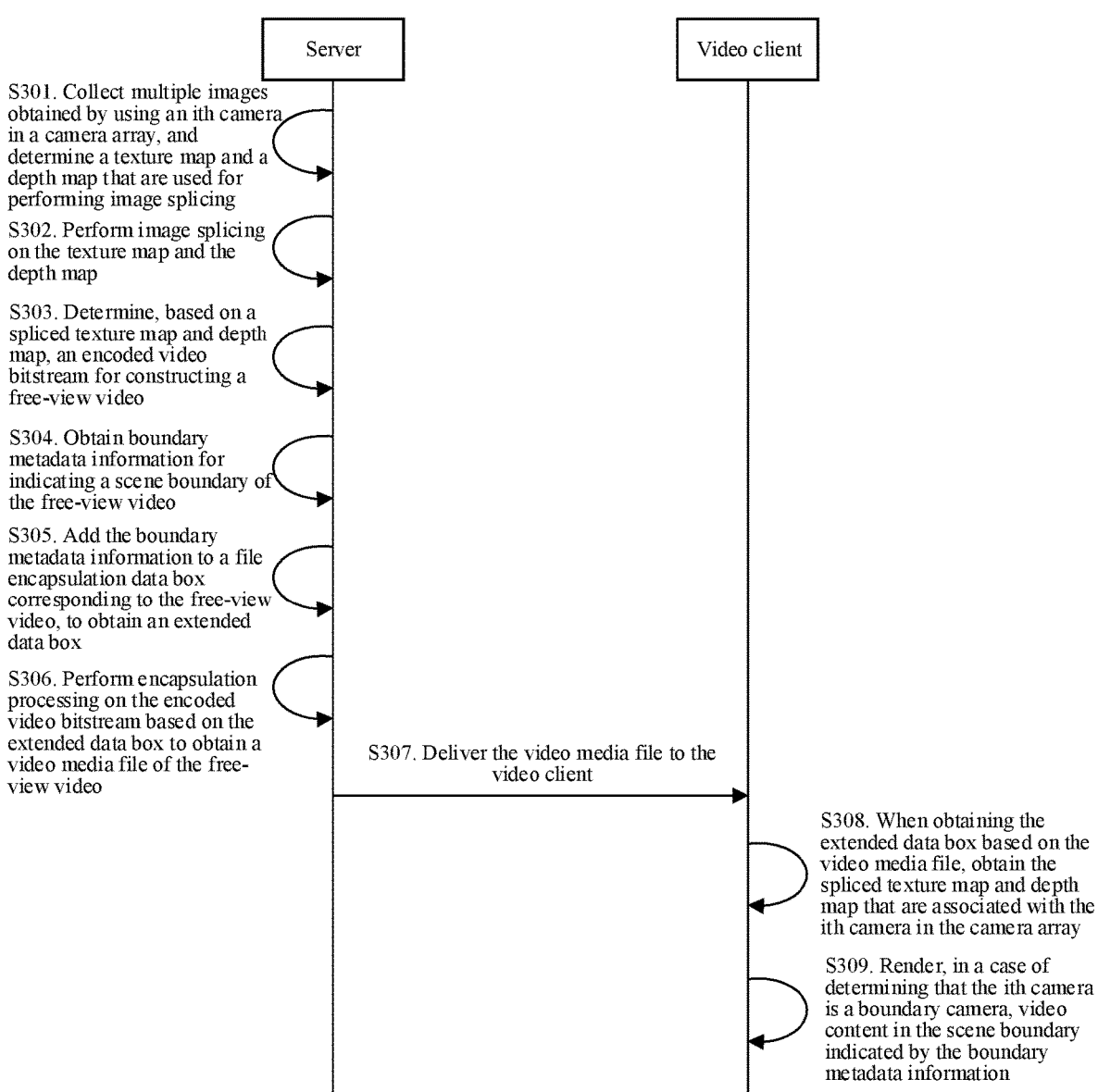

S301. Collect multiple images obtained by using an ith camera in a camera array, and determine a texture map and a depth map that are used for performing image splicing S302. Perform image splicing on the texture map and the depth map S303. Determine, based on a spliced texture map and depth map, an encoded video bitstream for constructing a free-view video S304. Obtain boundary metadata information for indicating a scene boundary of the free-view video S305. Add the boundary metadata information to a file encapsulation data box corresponding to the free-view video, to obtain an extended data box S306. Perform encapsulation processing on the encoded video bitstream based on the extended data box to obtain a video media file of the free-view video Server Video client S307. Deliver the video media file to the video client S308. When obtaining the extended data box based on the video media file, obtain the spliced texture map and depth map that are associated with the ith camera in the camera array S309. Render, in a case of determining that the ith camera is a boundary camera, video content in the scene boundary indicated by the boundary metadata information

FIG. 9

VIDEO DATA PROCESSING METHOD AND APPARATUS, COMPUTER DEVICE, COMPUTER READABLE STORAGE MEDIUM, AND COMPUTER PROGRAM PRODUCT

RELATED APPLICATIONS

This application is a continuation of International Application No. PCT/CN2022/123829, filed on Oct. 8, 2022, which claims priority to Chinese Patent Application No. 202111470639.2 filed on Dec. 3, 2021. The disclosures of the prior applications are hereby incorporated by reference in their entirety.

FIELD OF THE TECHNOLOGY

This application relates to the field of computer technologies, including a video data processing method and apparatus, a computer device, a computer readable storage medium, and a computer program product.

BACKGROUND OF THE DISCLOSURE

In a process of performing video processing on a free-view video, generally, encoding processing is performed on content collected by a camera array (for example, a texture map and a depth map), to obtain an encoded video bitstream, and further, encapsulation processing may be performed on the encoded video bitstream to obtain a corresponding video media file. However, the inventors found in practice that: In a current file encapsulation technology, only some basic metadata information related to presentation of a free-view video is indicated, for example, a quantity of cameras included in a camera array, an identifier of each camera, a position of each camera, and information related to a collected texture map and depth map. Therefore, when a more complex boundary problem is involved, if a video client considers only these basic metadata information, quality of video rendering within a scene boundary may be reduced.

SUMMARY

Embodiments of this disclosure provide a video data processing method and apparatus, a computer device, a computer readable storage medium, and a computer program product, so as to improve quality of video rendering within a scene boundary.

In an embodiment, a video data processing method includes generating, based on a spliced texture map and depth map, an encoded video bitstream for constructing a free-view video, the spliced texture map and depth map being based on multiple images collected by an ith camera in a camera array. The camera array includes N cameras, and i is a positive integer less than or equal to N. The method further includes obtaining boundary metadata information indicating a scene boundary of the free-view video, and adding the boundary metadata information to a file encapsulation data box corresponding to the free-view video, to obtain an extended data box. The method further includes performing encapsulation processing on the encoded video bitstream and the extended data box to obtain a video media file of the free-view video including the boundary metadata information. The method further includes delivering the video media file to a video client, enabling the video client to determine that the ith camera is a boundary camera, and to render video content in the scene boundary indicated by the boundary metadata information.

to render video content in the scene boundary indicated by the boundary metadata information.

In an embodiment, an apparatus for data processing includes processing circuitry configured to generate, based on a spliced texture map and depth map, an encoded video bitstream for constructing a free-view video. The spliced texture map and depth map are based on multiple images collected by an ith camera in a camera array, the camera array includes N cameras, and i is a positive integer less than or equal to N. The processing circuitry is further configured to obtain boundary metadata information indicating a scene boundary of the free-view video, and add the boundary metadata information to a file encapsulation data box corresponding to the free-view video, to obtain an extended data box. The processing circuitry is further configured to perform encapsulation processing on the encoded video bitstream and the extended data box to obtain a video media file of the free-view video including the boundary metadata information. The processing circuitry is further configured to deliver the video media file to a video client, enabling the video client to determine that the ith camera is a boundary camera, and to render video content in the scene boundary indicated by the boundary metadata information.

In an embodiment, a non-transitory computer-readable storage medium stores computer-readable instructions which, when executed by a computer device, cause the computer device to perform a video data processing method that includes generating, based on a spliced texture map and depth map, an encoded video bitstream for constructing a free-view video, the spliced texture map and depth map being based on multiple images collected by an ith camera in a camera array. The camera array includes N cameras, and i is a positive integer less than or equal to N. The method further includes obtaining boundary metadata information indicating a scene boundary of the free-view video, and adding the boundary metadata information to a file encapsulation data box corresponding to the free-view video, to obtain an extended data box. The method further includes performing encapsulation processing on the encoded video bitstream and the extended data box to obtain a video media file of the free-view video including the boundary metadata information. The method further includes delivering the video media file to a video client, enabling the video client to determine that the ith camera is a boundary camera, and to render video content in the scene boundary indicated by the boundary metadata information.

In the embodiments of this disclosure, when obtaining, by using multiple images collected by an ith camera in a camera array, a texture map and a depth map that are used for performing splicing, a server (that is, an encoder end) may determine, based on the spliced texture map and depth map, an encoded video bitstream used for constructing a free-view video, where the camera array includes N cameras, and i herein is a positive integer less than or equal to N. The server may obtain boundary metadata information used for indicating a scene boundary of the free-view video, and add the boundary metadata information to a file encapsulation data box corresponding to the free-view video, to obtain an extended data box corresponding to the file encapsulation data box. The server may perform encapsulation processing on the encoded video bitstream based on the obtained extended data box, so as to obtain a video media file that is to be delivered to a video client (that is, a decoding end). In this way, when obtaining the extended data box based on the video media file, the video client may obtain a spliced texture map and depth map associated with the ith camera, and when determining that the ith camera is a boundary camera, video content in a scene boundary indicated by the boundary metadata information may be rendered on the video client. In this way, in a file encapsulation process, the embodiments of this disclosure may provide boundary metadata information, and the boundary metadata information may be added to a corresponding video media file, so that the video client can determine, according to the boundary metadata information, a scene boundary of a renderable free-view video, and then render and present corresponding video content in the scene boundary, thereby improving quality of video rendering in the scene boundary.

BRIEF DESCRIPTION OF THE DRAWINGS

To describe technical solutions in embodiments of this disclosure more clearly, the following briefly introduces the accompanying drawings describing the embodiments. The accompanying drawings in the following description show only some embodiments of this disclosure, and a person of ordinary skill in the art may still derive other drawings from these accompanying drawings.

FIG. 7 is a schematic flowchart of a video data processing method according to an embodiment of this disclosure.

FIG. 8 is a schematic flowchart of another video data processing method according to an embodiment of this disclosure.

FIG. 9 is a schematic flowchart of still another video data processing method according to an embodiment of this disclosure.

DESCRIPTION OF EMBODIMENTS

The technical solutions in embodiments of this disclosure are clearly and completely described in the following with reference to the accompanying drawings in the embodiments of this disclosure. The described embodiments are merely some rather than all of the embodiments of this disclosure. All other embodiments obtained by a person of ordinary skill in the art based on the embodiments of this application shall fall within the protection scope of this disclosure.

Immersive media is a media file that can provide immersive media content, so that a service object immersed in the media content can obtain sensory experience such as visual and auditory experience in a real world. The immersive media may be classified into 3DoF media, 3DoF+ media, and 6DoF media according to a degree of freedom (DoF) of a service object in consuming media content. A free-view video is common 3DoF+ media and 6DoF media, or may be referred to as a multi-view video, a multi-viewpoint video, or a free-view video. The free-view video herein refers to a video, collected by a camera array consisting of multiple cameras for the same three-dimensional scene from multiple angles, with texture information (for example, color information) and depth information (for example, space distance information) and including different angles of view. In the embodiments of this disclosure, a user who consumes immersive media (for example, a free-view video) may be collectively referred to as a service object.

Figures 1, 2:
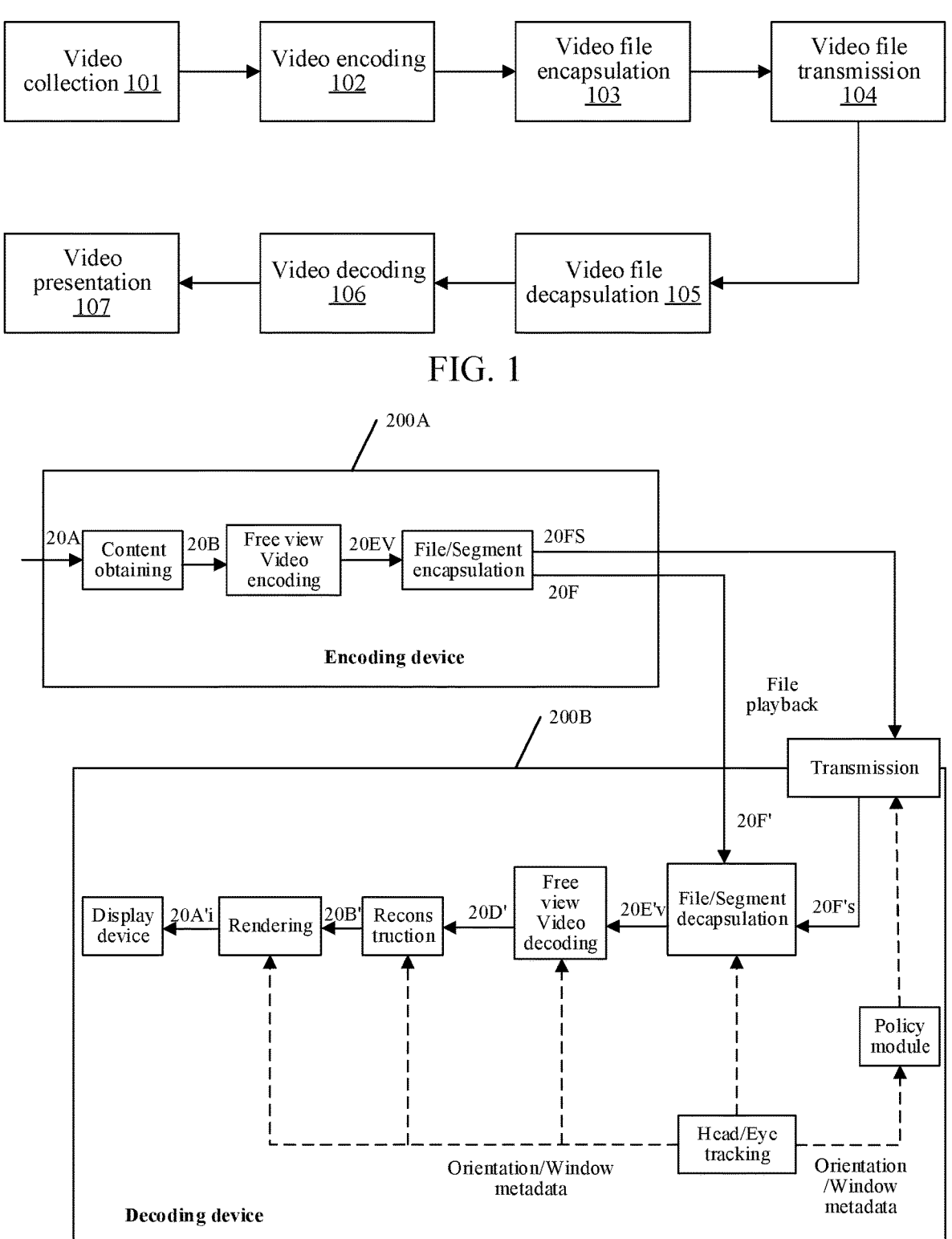
FIG. 1 is a schematic flowchart of video processing according to an embodiment of this disclosure.
FIG. 2 is a schematic architecture diagram of a free-view video system according to an embodiment of this disclosure.

The embodiments of this disclosure relate to a free-view video processing technology. For a processing process, refer to FIG. 1. FIG. 1 is a schematic flowchart of video processing according to an embodiment of this disclosure. As shown in FIG. 1, a complete processing process for a free-view video may include the following steps: video collection 101, video encoding 102, video file encapsulation 103, video file transmission 104, video file decapsulation 105, video decoding 106, and final video presentation 107.

Video collection is used for converting an analog video into a digital video, and storing the digital video in a format of a digital video file. That is, video collection may convert video signals collected by multiple cameras from different angles into binary digital information, where binary digital information converted from a video signal is a binary data stream, and the binary digital information may also be referred to as a code stream or a bitstream of the video signal. Video encoding refers to converting a file of an original video format into a file of another video format by using a compression technology. From a perspective of a manner of obtaining a video signal, a manner of generating a video signal may be divided into two manners of photographing by a camera and generating by a computer. Because of different statistical characteristics, compression encoding manners corresponding to the video signal may also be different. A common compression encoding manner may include an international video encoding standard High Efficiency Video Coding (HEVC/H.265), an international video encoding standard Versatile Video Coding (VVC/H.266), a national video encoding standard Audio Video Coding Standard (AVS), a third-generation video coding standard introduced by the AVS Standards Workgroup (AVS3), and the like.

After video encoding, an encoded data stream (that is, an encoded video bitstream) needs to be encapsulated, and an encapsulated data stream is transmitted to a service object. Video file encapsulation means that a compressed video code stream and an audio code stream are encoded according to an encapsulation format (or a container, or a file container), and stored in a file according to a specific format. A common encapsulation format includes an Audio Video Interleaved format (AVI) or an International Standard Organization (ISO) based media file format (ISOBMFF). ISOBMFF is an encapsulation standard of a media file, and a most typical ISOBMFF file is a Moving Picture Experts Group 4 (MP4) file. In an embodiment, an audio code stream and a video code stream are encapsulated in a file container (also referred to as a video media file) according to a file format such as ISOBMFF. In an encapsulation file, a track is used as a media data set in a file encapsulation process, and one encapsulation file may include multiple tracks, for example, one encapsulation file may include one video track, one audio track, and one caption track. A sample is used as an encapsulation unit in the file encapsulation process, and one track may include multiple samples. For example, one sample in a video track is generally one video frame.

The encapsulation file is transmitted to a video client on a user terminal by using a video, and the video client may perform final video content presentation in the video client after performing inverse operations such as decapsulation and decoding. The encapsulation file may be sent to the video client by using a transmission protocol. The transmission protocol may be, for example, Dynamic Adaptive Streaming over HTTP (DASH), which is an adaptive bit rate stream technology, and transmission is performed by using the DASH, so that high-quality streaming media can be transmitted over the Internet by using a traditional HTTP network server. In the DASH, media segment information is described by using media presentation description signaling (MPD) in the DASH, and in the DASH, a combination of one or more media components, such as a resolution video file may be considered as a representation, and multiple representations included may be considered as an adaptation set of video streams, and one DASH may include a set of one or more video streams.

It may be understood that a file decapsulation process of the video client is reversed to the foregoing file encapsulation process, and the video client may decapsulate the encapsulation file according to a file format requirement at the time of encapsulation, to obtain an audio code stream and a video code stream. A decoding process of the video client is also reversed to the encoding process. For example, the video client may decode a video code stream to restore video content, and decode an audio code stream to restore audio content.

For ease of understanding, refer to FIG. 2 together. FIG. 2 is a schematic architecture diagram of a free-view video system according to an embodiment of this disclosure. As shown in FIG. 2, the free-view video system may include an encoding device (e.g., an encoding device 200A) and a decoding device (e.g., a decoding device 200B). The encoding device may be a computer device used by a provider of a free-view video, and the computer device may be a terminal (such as a personal computer (PC) or an intelligent mobile device (such as a smartphone)) or a server. The decoding device may be a computer device used by a user of the free-view video. The computer device may be a terminal (such as a PC, an intelligent mobile device (such as a smartphone), or a VR device (such as a VR helmet and VR glasses). The computer device is integrated with a video client. A data processing process of the free-view video includes a data processing process on the encoding device side and a data processing process on the decoding device side.

The data processing process on the encoding device side mainly includes: a process of obtaining and producing media content of the free-view video; and a process of encoding and file encapsulation of the free-view video. The data processing process on the decoding device side mainly includes: a process of file decapsulation and decoding of the free-view video; and a rendering process of the free-view video. In addition, a free-view video transmission process is involved between the encoding device and the decoding device. The transmission process may be performed based on various transmission protocols. The transmission protocols herein may include but are not limited to: a DASH protocol, an HTTP Live Streaming (HLS) protocol, a Smart Media Transport Protocol (SMTP), a Transmission Control Protocol (TCP), and the like.

With reference to FIG. 2, the following separately describes in detail processes involved in the data processing process of the free-view video.

The data processing process on the encoding device side includes: a process of obtaining and producing media content of the free-view video, and a process of encoding and file encapsulation of the free-view video. The following separately describes the process of obtaining and producing the media content of the free-view video, and the process of encoding and file encapsulation of the free-view video.

In the process of obtaining and producing the media content of the free-view video, first, the process of obtaining the media content of the free-view video is performed. The media content of the free-view video is obtained by collecting a real-world sound-visual scene by a capture device. In one implementation, the capture device may refer to a hardware component disposed in the encoding device, for example, the capture device refers to a microphone, a camera, a sensor, and the like of a terminal. In another implementation, the capture device may also be a hardware apparatus connected to the encoding device, for example, a camera connected to a server, and is configured to provide a media content obtaining service of the free-view video for the encoding device. The capture device may include but is not limited to: an audio device, a camera device, and a sensing device. The audio device may include an audio sensor, a microphone, and the like. The camera device may include a common camera, a stereo camera, a light field camera, and the like. The sensing device may include a laser device, a radar device, and the like. There may be multiple capture devices, and these capture devices are deployed at specific positions in real space to simultaneously capture audio content and video content at different angles within the space, and both captured audio content and video content are synchronized in time and space. In this embodiment of this disclosure, media content in three-dimensional space that is collected by a capture device deployed at a specific position and that is used for providing multi-degree-of-freedom (such as 3DoF+ or 6DoF) viewing experience may be referred to as a free-view video.

For example, an example in which video content of the free-view video is obtained is used for description. As shown in FIG. 2, a visual scene 20A (which may be a real-world visual scene or a synthesized visual scene) may be captured by a camera array connected to the encoding device 200A, or may be captured by a camera device having multiple cameras and sensors connected to the encoding device 200A, or may be captured by multiple virtual cameras. A collection result may be source free-view data 20B (e.g., a texture map and a depth map corresponding to the visual scene 20A).

Then, in the process of producing the media content of the free-view video, the process of producing the media content of the free-view video in this embodiment of this disclosure may be understood as a process of producing content of the free-view video, and the content of the free-view video is mainly made of content in a form such as a multi-view video shot by cameras or a camera array deployed at multiple positions. For example, the encoding device may convert the free-view video from a three-dimensional representation to a two-dimensional representation. The free-view video herein may include geometric information, attribute information, placeholder map information, image set data, and the like.

In an implementation process, first, three-dimensional representation data of a collected input free-view video is projected to a two-dimensional plane, and the free-view video projected to the two-dimensional plane is generally represented by data of a geometric component, a placeholder component, and an attribute component in an orthogonal projection, a perspective projection, and an equi-rectangular projection (ERP) manner. Data of the geometric component provides position information of each point of the free-view video in three-dimensional space, data of the attribute component provides additional attributes (such as texture or material information) of each point of the free-view video, and data of the placeholder component indicates whether data in another component is associated with the free-view video. Then, the component data represented by the two-dimensional representation of the free-view video is processed to generate an image block. According to the position of the free-view video represented by the geometric component data, a two-dimensional plane region in which the two-dimensional representation of the free-view video is located is divided into multiple rectangular regions of different sizes. One rectangular region is an image block, and the image block includes necessary information for back projecting the rectangular region into three-dimensional space. Then, the image block is packaged to generate an image set, and the image block is placed in a two-dimensional grid, so as to ensure that a valid part of each image block does not overlap. An image block generated from one free-view video may be packaged into one or more image sets. Finally, corresponding geometric data, attribute data, and placeholder data are generated based on the image set data, and the image set data, the geometric data, the attribute data, and the placeholder data are combined to form a final representation of the free-view video on a two-dimensional plane.

Figure 3:
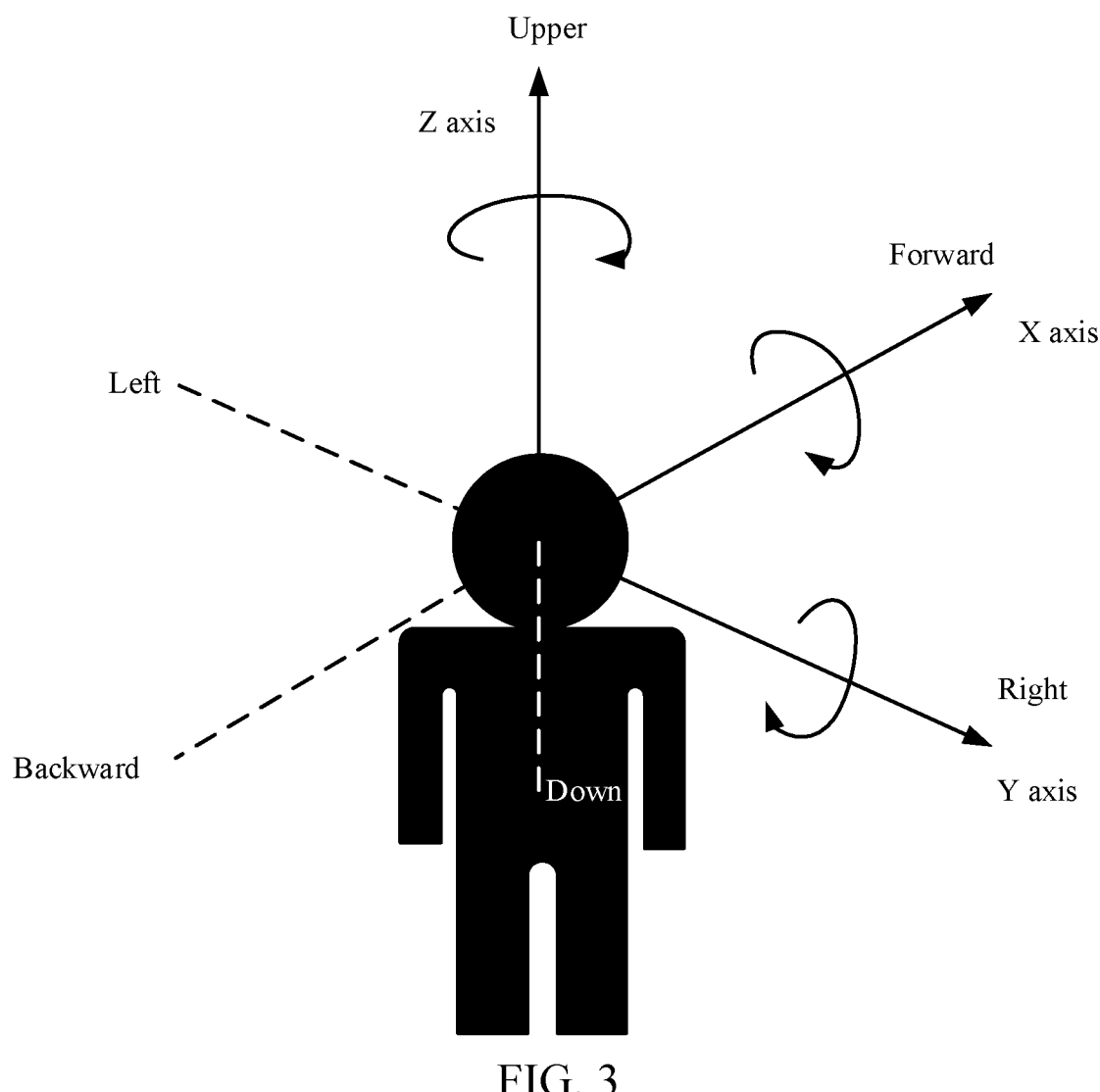
FIG. 3 is a schematic diagram of 6DoF according to an embodiment of this disclosure.
Figure 4:
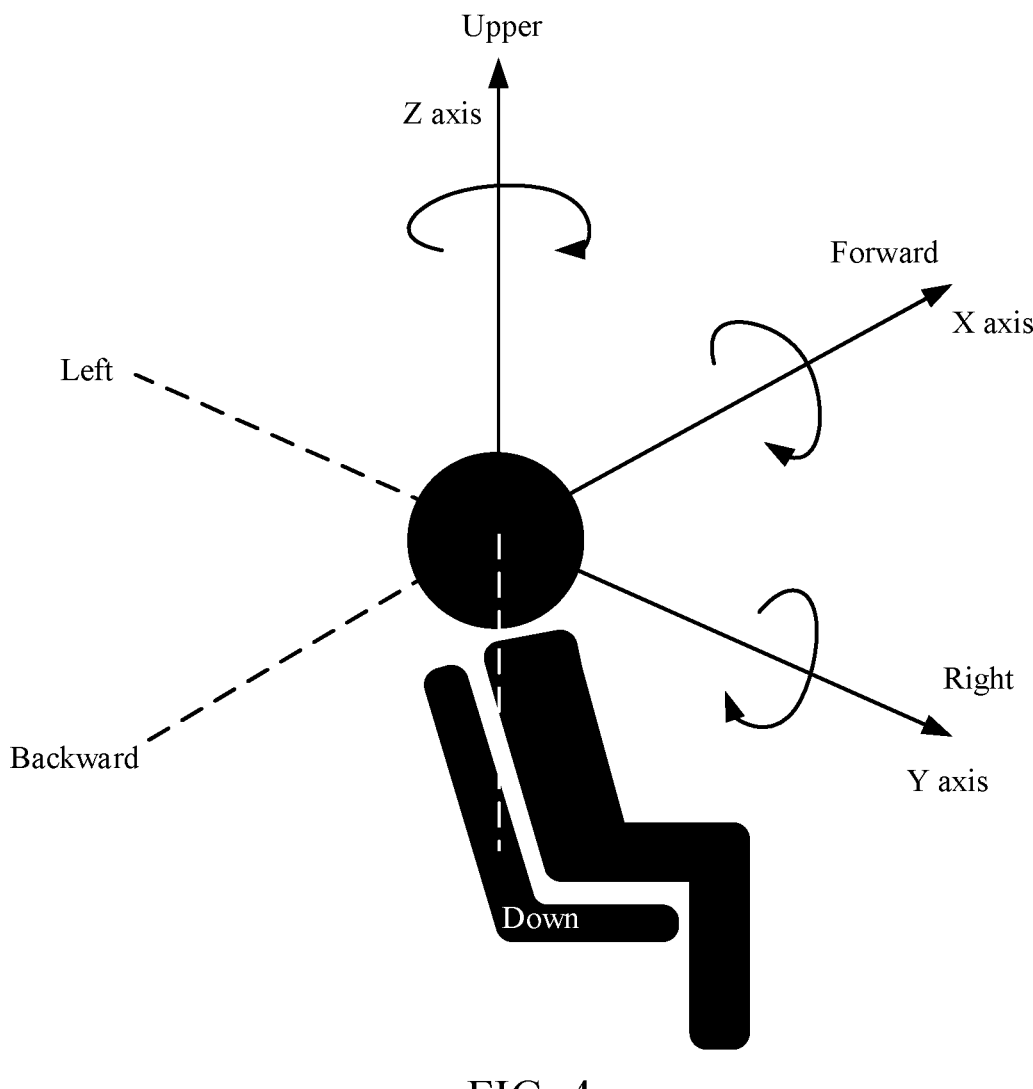
FIG. 4 is a schematic diagram of 3DoF+ according to an embodiment of this disclosure.
Figures 5, 6:
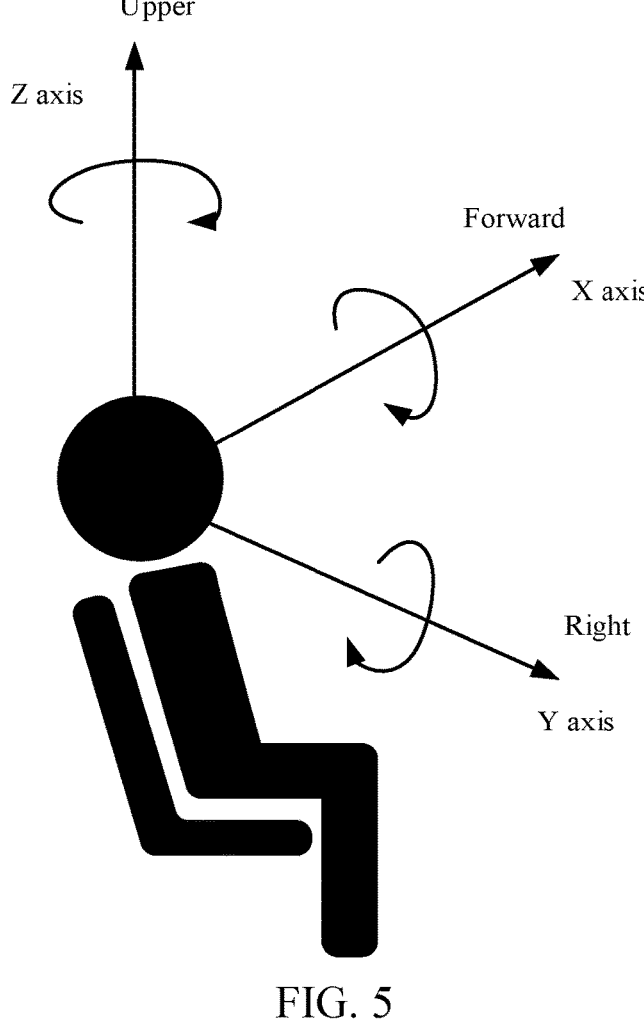
FIG. 5 is a schematic diagram of 3DoF according to an embodiment of this disclosure.
FIG. 6 is a schematic representation diagram of free-view video data according to an embodiment of this disclosure.

In addition, a panoramic video may be captured by using the capture device. After the video is processed by the encoding device and transmitted to the decoding device for corresponding data processing, a service object on the decoding device side needs to view video information at 360 degrees by performing some specific actions (such as head rotation), and performing an unspecific action (such as moving the head) does not obtain a corresponding video change, and VR experience is poor. Therefore, additional depth information that matches the panoramic video needs to be provided, so that the service object obtains better immersion and better VR experience. This relates to a 6DoF production technology. When the service object can move freely in an analog scene, it is referred to as 6DoF. When the video content of the free-view video is produced by using the 6DoF production technology, a light field camera, a laser device, a radar device, and the like are generally used for capturing point cloud data or light field data in space. For ease of understanding, refer to FIG. 3 together. FIG. 3 is a schematic diagram of 6DoF according to an embodiment of this disclosure. As shown in FIG. 3, 6DoF is divided into window 6DoF, omnidirectional 6DoF, and 6DoF, where window 6DoF refers to limited rotational movement of a service object on an X-axis and a Y-axis, and limited translation on a Z-axis. For example, the service object cannot see a scene outside a window frame, and the service object cannot pass through the window. The omnidirectional 6DoF refers to limited rotational movement of a service object on the X-axis, the Y-axis, and the Z-axis. For example, the service object cannot freely pass through three-dimensional 360-degree VR content in a restricted moving region. 6DoF means that a service object may move freely along the X-axis, the Y-axis, and the Z-axis on the basis of 3DoF. For example, the service object may move freely in three-dimensional 360-degree VR content. Similar to 6DoF, there are also 3DoF and 3DoF+ production technologies. Referring to FIG. 4, FIG. 4 is a schematic diagram of 3DoF+ according to an embodiment of this disclosure. As shown in FIG. 4, 3DoF+ means that when a virtual scene provided by immersive media has depth information, a service object header may move, based on 3DoF, in limited space to view a picture provided by media content. Referring to FIG. 5, FIG. 5 is a schematic diagram of 3DoF according to an embodiment of this disclosure. As shown in FIG. 5, 3DoF means that a service object is fixed at a central point in three-dimensional space, and a service object header rotates along the X-axis, the Y-axis, and the Z-axis to view a picture provided by media content.

In the process of encoding and file encapsulation of the free-view video, audio content captured may be directly encoded to form an audio code stream of the free-view video. Captured video content may be encoded to obtain a video code stream of the free-view video. In this embodiment of this disclosure, the video code stream of the free-view video may be referred to as an encoded video bitstream. If the 6DoF production technology is used, a specific encoding manner (such as a point cloud compression manner based on traditional video encoding) needs to be used for encoding in a video encoding process. Video encoding of the free-view video is used as an example. The encoding device may perform image splicing on a texture map that carries texture information and a depth map that carries depth information and that is collected by a camera array to obtain a spliced texture map and depth map, so as to encode the spliced texture map and depth map, so as to obtain an encoded video bitstream used for constructing the free-view video.

Encapsulating an audio code stream and a video code stream in a file format (such as ISOBMFF) of the free-view video in a file container to form a media file resource of the free-view video, where the media file resource may be a media file of the free-view video formed by a media file or a media segment. According to a file format of the free-view video, media presentation description information (that is, MPD) is required to record metadata of a media file resource of the free-view video. Metadata herein is a general name of information related to presentation of the free-view video. The metadata may include description information of the media content, free-view metadata information describing one or more views included in a track of the free-view video, boundary metadata information describing a scene boundary of the free-view video, description information about a window, signaling information related to presentation of the media content, and the like. The encoding device stores the media presentation description information and the media file resource generated after the data processing process. The media presentation description information and the media file resource herein may be encapsulated into a video media file that is to be delivered to the decoding device according to a specific media file format.

The collected audio is encoded into a corresponding audio code stream. Geometric information, attribute information, and placeholder map information of the free-view video may be encoded in a traditional video encoding manner, and image set data of the free-view video may be encoded in an entropy encoding manner. Then, the encoded media are encapsulated in a file container in a specific format (for example, ISOBMFF or HNSS) and combined with metadata and window metadata that describe media content attributes, to form a media file or form an initialization segment and a media segment according to a specific media file format. Herein, a media file or an initialization segment and a media segment formed may be collectively referred to as a video media file, and further, the obtained video media file may be delivered to a corresponding decoding device.

For example, as shown in FIG. 2, the encoding device 200A encodes one or more free-view video frames (for example, image frames obtained after image splicing is performed on the texture map and the depth map) from the view data 20B to obtain an encoded code stream 20Ev (for example, an encoded video bitstream), where the code stream 20Ev includes one image set code stream (that is, a code stream obtained after encoding the image set data), at most one occupation code stream (that is, a code stream obtained after encoding the placeholder map information), one geometric code stream (that is, a code stream obtained after encoding the geometric information), and zero or more attribute code streams (that is, a code stream obtained after encoding the attribute information). Subsequently, the encoding device 200A may encapsulate one or more encoded code streams into a media file 20F for local playback according to a specific media file format (e.g., ISOBMFF), or into a segment sequence 20Fs containing an initialization segment and multiple media segments for streaming transmission. In addition, a file encapsulator in the encoding device 200A may also add relevant metadata to the media file 20F or the fragment sequence 20Fs. Further, the encoding device 200A may transmit the segment sequence 20Fs to the decoding device 200B using a transmission mechanism (e.g., DASH or SMTP), while also transmitting the media file 20F to the decoding device 200B. The decoding device 200B herein may be a player.

The data processing process on the decoding device side includes: the process of file decapsulation and decoding of the free-view video, and the process of rendering the free-view video. The following separately describes the process of file decapsulation and decoding of the free-view video and the process of rendering the free-view video.

In the process of file decapsulation and decoding of the free-view video, the decoding device may adaptively dynamically obtain the media file resource and corresponding media presentation description information of the free-view video from the encoding device by means of recommendation of the encoding device or according to a service object requirement on the decoding device side. For example, the decoding device may determine an orientation and a position of the service object according to tracking information of a header/an eye of the service object; and then, request a corresponding media file resource from the encoding device based on the determined orientation and position dynamics. The media file resource and the media presentation description information are transmitted by the encoding device to the decoding device by using a transmission mechanism (e.g., DASH or SMT). The file decapsulation process on the decoding device side is reversed to the file encapsulation process on the encoding device side. The decoding device decapsulates the media file resource according to a file format (for example, ISOBMFF) of the free-view video to obtain an audio code stream and a video code stream. The decoding process on the decoding device side is reversed to the encoding process on the encoding device side. The decoding device performs audio decoding on the audio code stream to restore audio content. The decoding device decodes the video code stream to restore video content.

For example, as shown in FIG. 2, the media file 20F outputted by the file encapsulator in the encoding device 200A is the same as the media file 20F' inputted to a file decapsulator in the decoding device 200B. The file decapsulator performs file decapsulation processing on the media file 20F' or a received segment sequence 20F's, extracts an encoded code stream 20E'$_v$, parses corresponding metadata, and then decodes the code stream 20E', to obtain a decoded video signal 20D' (that is, restored video content).

In the process of rendering the free-view video, the decoding device renders, according to metadata related to rendering in the media presentation description information corresponding to the media file resource, audio content obtained by means of audio decoding and video content obtained by means of video decoding. After rendering is completed, playback output of the image is implemented.

For example, as shown in FIG. 2, the decoding device 200B may reconstruct a decoded video signal 20D' based on a current viewing direction or window to obtain reconstructed free-view video data 20B', so as to render the reconstructed free-view video data 20B' and display it on a screen of a head mounted display or any other display device. The current viewing direction is determined by means of head tracking and eye tracking. In window-related transmission, the current viewing direction is also transferred to a policy module in the decoding device 200B, and the policy module may determine a track to be received according to the current viewing direction.

The free-view video system supports a data box. The data box refers to a data block or object that includes metadata, that is, the data box includes metadata of corresponding media content. The free-view video may include multiple data boxes, for example, an ISO Base Media File Format Box (ISOBMFF Box). The file encapsulation data box includes metadata that is used for describing corresponding information when a file is encapsulated, for example, may include boundary metadata information obtained by means of construction or free-view metadata information obtained by means of construction. The ISOBMFF box may be extended to obtain an extended data box. The extended data box herein may include a boundary information data box and an updated free-view information data box. Metadata information (for example, boundary metadata information) provided by the boundary information data box is used for describing a scene boundary of the free-view video. The scene boundary herein may be understood as a space boundary that may be presented to the service object. The updated free-view information data box is obtained by extending and updating an existing initial free-view information data box. Metadata information (for example, free-view metadata information) provided by the updated free-view information data box is used for describing view information in a free-view video track.

Referring to FIG. 6 together, FIG. 6 is a schematic representation diagram of free-view video data according to an embodiment of this disclosure. As shown in FIG. 6, in this embodiment of this disclosure, to facilitate expression, storage, compression, and processing of a free-view video, free-view video data may be represented as a combination of the following information: texture maps 601 collected by multiple cameras in a camera array, depth maps 602 corresponding to multiple camera texture maps, and corresponding free-view video content description metadata 603 (that is, metadata recorded by using media presentation description information). The free-view video content description metadata may include parameters of the multiple cameras, a splicing layout of the free-view video, edge protection, and other description information.

This embodiment of this disclosure provides a method for implementing file encapsulation and signaling indication of a free-view video based on the metadata information provided by the foregoing extended data box. In a process of producing media content of a free-view video, the encoding device may first obtain texture maps and depth maps of multiple cameras by using a camera array including multiple (for example, N) cameras, and then perform image splicing on the texture maps and the corresponding depth maps of the multiple cameras to obtain a spliced image corresponding to each camera (that is, an image frame formed by a spliced texture map and depth map). If background information is subsequently required, the background information may also be spliced into a corresponding image frame. In some embodiments, the obtained spliced image may be encoded to obtain an encoded video bitstream for constructing the free-view video. For ease of understanding, an ith camera in the camera array is used as an example herein for description, where i is a positive integer less than or equal to N. For example, the encoding device may collect multiple images by using the ith camera. Based on the multiple images, texture maps and depth maps associated with the ith camera and used for performing image splicing may be obtained, and the spliced texture map and depth map may be encoded in a specific compression encoding manner (for example, a plane video compression manner). It is to be understood that similar processing may also be performed on a texture map and a depth map that are collected by another camera in the camera array, so as to finally obtain a corresponding encoded video bitstream.

In some embodiments, the encoding device may obtain the foregoing extended metadata information (for example, the boundary metadata information), and may add the foregoing extended metadata information to a file encapsulation data box (for example, an ISOBMFF box), so as to obtain an extended data box corresponding to the file encapsulation data box. Subsequently, the encoding device may encapsulate, based on the extended data box, the foregoing generated encoded video bitstream to obtain a video media file of the free-view video. In the file encapsulation process, the encoding device encapsulates the metadata information provided by the extended data box into the video media file.

This embodiment of this disclosure provides a scene boundary indication method for a free-view video. According to information such as a camera parameter during shooting of the free-view video, metadata information (that is, the boundary metadata information) related to the scene boundary is added to the video media file of the free-view video. For example, the method may include: identifying a boundary camera and information such as a position and an orientation of the boundary camera that constitute a scene boundary; indicating a content region range photographed by the boundary camera; and indicating a region range of the scene boundary and a processing manner when the scene boundary is exceeded.

In some embodiments, the encoding device may transfer the obtained video media file to the decoding device, so that the decoding device reconstructs the free-view video into three-dimensional space. For example, when obtaining the foregoing extended data box based on the video media file, the decoding device may obtain, from the video media file based on the metadata information provided by the extended data box, a spliced texture map and depth map that are associated with each camera (for example, the ith camera), obtain position information and orientation information of a service object on the decoding device side according to an algorithm of a free-view video application, and synthesize texture information and depth information from different cameras (that is, information provided by the texture map and the depth map after image splicing) with reference to a free-view visual point requested by the service object, so that video content corresponding to the free-view virtual point can be rendered on the video client installed on the decoding device.

It is to be understood that, in this embodiment of this disclosure, impact caused by the scene boundary of the free-view video may be considered, and the decoding device may determine, in the spliced texture map and depth map that are associated with the multiple cameras, the spliced texture map and depth map that are used for synthesized rendering. For ease of description, in this embodiment of this disclosure, the spliced texture map and depth map that are used for synthesized rendering may be collectively referred to as a target spliced image, so as to determine whether a camera corresponding to the target spliced image is a boundary camera, so as to determine the scene boundary of the free-view video. Herein, the ith camera is still used as an example for description. Assuming that the camera corresponding to the target spliced image includes the ith camera, the decoding device determines whether the ith camera is a boundary camera. When determining that the ith camera is a boundary camera, the decoding device may determine the scene boundary of the free-view video based on the boundary metadata information carried in the extended data box, so that corresponding video content in the scene boundary can be rendered on the video client according to an object behavior (which may also be referred to as an interaction behavior) of the service object.

In this embodiment of this disclosure, an object behavior of a service object refers to any interaction behavior between the service object and a currently consumed free-view video, including but not limited to at least one of the following: zooming behavior, switching behavior, and position interaction behavior. The zooming behavior refers to an operation in which the service object performs picture size zooming-out or zooming-in on video content of the free-view video. For example, video content A1 may be zoomed in by double-clicking the video content A1. For another example, the video content A1 may be slidably stretched at the same time in different directions with two fingers, so as to zoom out or zoom in a picture of the video content A1. The foregoing switching behavior may include a playback rate switching operation, a picture quality switching operation (that is, a definition switching operation), a flip operation, a content switching operation performed for the video content of the free-view video, and another predefined event-based triggering operation that is allowed to be performed at an application layer, for example, a click operation on a target position in a picture, and a triggering operation when the service object faces a target direction. The foregoing position interaction behavior refers to an operation, such as a change of a real-time position, a change of a viewing direction, or a change of a view angle direction, on object position information (that is, user position information) generated when the service object watches the video content of the free-view video. For example, when a position of a service object B changes, video content associated with a changed position and within the scene boundary is rendered and presented on the video client.

The method in this embodiment of this disclosure may be applied to a free-view video storage, transmission, encapsulation, and decapsulation process.

For a process of constructing the boundary metadata information or the free-view metadata information by the encoding device, refer to the description in the embodiment corresponding to FIG. 7. For a process in which the decoding device renders the corresponding video content based on the metadata information provided by the extended data box, refer to the description in the embodiment corresponding to FIG. 8.

In some embodiments, referring to FIG. 7, FIG. 7 is a schematic flowchart of a video data processing method according to an embodiment of this disclosure. The method may be performed by an encoding device (for example, the encoding device 200A in the foregoing embodiment corresponding to FIG. 2) in a free-view video system. For example, the encoding device may be a server. The method may include at least the following steps S101 to S104:

Step S101: Determine, based on a spliced texture map and depth map, an encoded video bitstream for constructing a free-view video. For example, an encoded video bitstream for constructing a free-view video is generated based on a spliced texture map and a depth map, the spliced texture map and depth map being based on multiple images collected by an ith camera in a camera array. The camera array includes N cameras, and i is a positive integer less than or equal to N.

Herein, the server may shoot a three-dimensional scene from multiple angles by using a camera array including multiple (for example, N) cameras, to obtain texture information (color information or the like) and depth information (space distance information or the like) of the three-dimensional scene. In this embodiment of this disclosure, an ith camera in the camera array is used as an example for description. For a processing process of another camera in the camera array, refer to the ith camera, where i is a positive integer less than or equal to N. The server may first obtain multiple images obtained by photographing the three-dimensional scene by using the ith camera, that is, original images, and then may perform image processing on the multiple original images, so as to obtain corresponding texture maps and depth maps. Alternatively, the ith camera may directly output corresponding texture maps and depth maps, and further may transmit the obtained texture maps and depth maps to the server, where the ith camera (for example, a depth camera) may actively process, inside the camera, the collected multiple original images, so as to obtain the corresponding texture maps and depth maps, and send the obtained texture maps and depth maps to the server. In some embodiments, the server may perform image splicing on the obtained texture maps and depth maps to obtain a spliced texture map and depth map associated with the ith camera. In this embodiment of this disclosure, the spliced texture map and depth map may be collectively referred to as a spliced image. For a texture map and a depth map that are associated with another camera in the camera array, the server also performs similar image splicing processing on the another camera in the camera array, so as to obtain a spliced image corresponding to each camera. In some embodiments, the server may determine, based on the spliced image corresponding to the ith camera, an encoded video bitstream used for constructing a free-view video. The server may separately encode the spliced image (for example, the spliced image corresponding to the ith camera) corresponding to each camera, to finally obtain an encoded video bitstream used for constructing a free-view video. A specific video compression algorithm may be used for encoding, for example, an AVS3 coding technology and an HEVC coding technology.

Step S102: Obtain boundary metadata information used for indicating a scene boundary of the free-view video, and add the boundary metadata information to a file encapsulation data box corresponding to the free-view video, to obtain an extended data box corresponding to the file encapsulation data box. For example, boundary metadata information indicating a scene boundary of the free-view video is obtained and added to a file encapsulation data box corresponding to the free-view video, to obtain an extended data box.

It may be understood that the camera array may include one or more (e.g., M) boundary cameras. Assuming that the camera array includes M boundary cameras, M may be a field value of a boundary camera count field associated with the boundary camera, and the boundary camera count field herein may be used for indicating a quantity of boundary cameras constituting a scene boundary of a free-view video. M is a positive integer less than or equal to N.

In this embodiment of this disclosure, boundary metadata information may be provided by using a boundary information data box of the free-view video. The boundary information data box may include sub-boundary metadata information corresponding to each boundary camera. For ease of understanding, this embodiment of this disclosure is described by using an example in which a boundary camera constructs corresponding sub-boundary metadata information. For example, a jth boundary camera in the foregoing M boundary cameras is used as an example, and the server may obtain a camera identifier of the jth boundary camera in the M boundary cameras, where j is a positive integer less than or equal to M, the camera identifier of the jth boundary camera may be used for indicating that a content region range photographed by the jth boundary camera is to be rendered for the service object, and the service object herein is associated with the free-view video, which may refer to any user consuming free-view video content, for example, a user watching the free-view video. In some embodiments, the server may construct camera parameter field information (camera parameter information), cross-boundary processing field information (cross-boundary processing information), and boundary range field information (boundary range information) of a scene boundary of the jth boundary camera, and may further obtain, based on the constructed camera parameter field information, cross-boundary processing field information, and boundary range field information, a boundary information data box corresponding to the scene boundary. It is to be understood that, the camera identifier, the camera parameter field information, the cross-boundary processing field information, and the boundary range field information of the jth boundary camera may constitute sub-boundary metadata information corresponding to the jth boundary camera. The cross-boundary processing field information is used for indicating a processing manner when an object behavior of the service object exceeds the scene boundary, and the boundary range field information is used for indicating a rendering region range when the scene boundary is rendered. Therefore, in this embodiment of this disclosure, the boundary range field information may indicate different scene boundaries.

When a field value of the boundary range field information is a first range field value (range value), the server may determine, based on the content region range photographed by the jth boundary camera, a first scene boundary corresponding to the rendering region range, and may determine, as boundary metadata information used for indicating the first scene boundary of the free-view video, information that is carried in the boundary information data box and that is associated with the first scene boundary. When the field value of the boundary range field information is a second range field value, the server may construct a second scene boundary corresponding to the rendering region range, and determine, as boundary metadata information used for indicating the second scene boundary of the free-view video, information that is carried in the boundary information data box and that is associated with a boundary type of the second scene boundary. It may be understood that, by setting the field value of the boundary range field information to the first range field value, the first scene boundary may be formed by the content region range photographed by each boundary camera, which is equivalent to using an implicit boundary indication policy. Generally, the obtained first scene boundary may be a boundary with an irregular shape. Similarly, by setting the field value of the boundary range field information to the second range field value, the second scene boundary of a designated boundary type may be obtained, which is equivalent to using an explicit boundary indication policy. Generally, the obtained second scene boundary is a boundary of a regular shape, such as a hexahedron, a sphere, or a cylinder.

In some implementations, the first scene boundary may be used as a scene boundary of the free-view video. Alternatively, the second scene boundary may be used as a scene boundary of the free-view video. In this case, the first scene boundary may simultaneously exist, and a region range corresponding to the second scene boundary may be greater than or equal to or less than a region range corresponding to the first scene boundary.

It may be understood that the camera parameter field information of the jth boundary camera may include a boundary camera extrinsic parameter and a boundary camera intrinsic parameter of the jth boundary camera. The boundary camera extrinsic parameter herein may include position information and orientation information of the jth boundary camera in a global reference coordinate system.

To support the foregoing steps, in this embodiment of this disclosure, several descriptive fields are added to a system layer, and a form of extending an existing ISOBMFF box is used as an example. A related field is defined to support an indication of a free-view video scene boundary. With reference to a related syntax, the following describes in detail an extended related field in the ISOBMFF box.

In this embodiment of this disclosure, a camera extrinsic parameter (for example, a boundary camera extrinsic parameter of a boundary camera) of a camera may be provided by using a camera extrinsic parameter structure (for example, ExtCameraInfoStruct) of a free-view video. For ease of understanding, referring to Table 1, Table 1 is used for indicating syntax of a camera extrinsic parameter structure of a free-view video according to an embodiment of this disclosure.

TABLE 1

```
aligned(8) class ExtCameraInfoStruct( ) {
    unsigned_int(1) camera_pos_present;
    unsigned int(1) camera_ori_present;
    if (camera_pos_present){
        signed int(32) camera_pos_x;
        signed int(32) camera_pos_y;
        signed int(32) camera_pos_z;
    }
    if (camera_ori_present){
        signed int(32) camera_quat_x;
        signed int(32) camera_quat_y;
        signed int(32) camera_quat_z;
    }
}
```

Semantics of the syntax shown in the foregoing Table 1 is as follows: A position parameter identifier field (that is, camera_pos_present) indicates whether a camera position parameter is presented. When a field value of the position parameter identifier field is 1 (that is, a first valid value), it indicates that a camera position parameter exists. On the contrary, when the field value of the position parameter identifier field is 0 (that is, a first invalid value), it indicates that no camera position parameter exists. A direction parameter identifier field (that is, camera_ori_present) indicates whether a camera direction parameter is presented. When a field value of the direction parameter identifier field is 1 (that is, a second valid value), it indicates that a camera direction parameter exists. On the contrary, when the field value of the direction parameter identifier field is 0 (that is, a second invalid value), it indicates that no camera direction parameter exists. camera_pos_x, camera_pos_y, and camera_pos_z jointly indicate position information of a camera in the global reference coordinate system, and respectively represent coordinates of x, y, and z that are of the camera position in the global reference coordinate system and that are in a unit of meter. These values may be in a unit of $2^{-16}$ meters. camera_quat_x, the camera_quat_y, and camera_quat_z jointly indicate orientation information of a camera, and respectively indicate components x, y, and z in quaternion of rotation of the camera. These values may be floating point values in a range of $[-1, 1]$. When each component of rotation information is missing, a default value of each component is 0. Calculation rules of each component are as follows in formulas (1) and (2):

$$qX=\text{camera\_quat\_x}÷2^{30}, \ qY=\text{camera\_quat\_y}÷2^{30}, \\ qZ=\text{camera\_quat\_z}÷2^{30} \tag{1}$$

The fourth component qW can be deduced according to a mathematical characteristic of a quaternion:

$$qW=\text{Sqrt}(1-(qX^2+qY^2+qZ^2)) \tag{2}$$

A quaternion (w, x, y, z) represents rotation around a vector (x, y, z) at a specific angle, and the specific angle is represented as follows: $2*\cos\hat{ }\{-1\}(w)=2*\sin\hat{ }\{-1\}(\text{sqrt}(x\hat{ }\{2\}+y\hat{ }\{2\}+z\hat{ }\{2\}))$.

It is to be understood that, for a non-boundary camera in the camera array, a corresponding camera extrinsic parameter may also be provided by using the camera extrinsic parameter structure shown in the foregoing Table 1.

The boundary camera intrinsic parameter of the jth boundary camera may include a camera identifier, a camera type field, photographing range field information (photographic range information), and camera depth field information that are corresponding to the jth boundary camera. The camera type field is used for indicating an attribute type of the jth boundary camera; the photographing range field information is used for indicating the content region range photographed by the jth boundary camera, and the content region range photographed by the jth boundary camera is associated with the attribute type of the jth boundary camera; and the camera depth field information is used for indicating depth information indicated by a visual cone associated with the jth boundary camera, and the camera depth field information may include near depth information indicated by a near plane of the visual cone and far depth information indicated by a far plane of the visual cone.

This embodiment of this disclosure provides multiple intrinsic parameter construction policies to construct a boundary camera intrinsic parameter. For example, the boundary camera intrinsic parameter may be determined by a first intrinsic parameter construction policy indicated by a parameter derivation field of the jth boundary camera. The first intrinsic parameter construction policy herein may include a first intrinsic parameter modification policy in a case that a field value of the parameter derivation field is a first derivation field value, and a second intrinsic parameter modification policy in a case that the field value of the parameter derivation field is a second derivation field value; the first intrinsic parameter modification policy is used for indicating that the jth boundary camera and a remaining boundary camera have different camera intrinsic parameters; and the second intrinsic parameter modification policy is used for indicating that the jth boundary camera and the remaining boundary camera have the same camera intrinsic parameters except the camera identifier. Herein the remaining boundary camera is a boundary camera other than the jth boundary camera in the M boundary cameras.

It may be understood that, by setting the field value of the parameter derivation field, the first intrinsic parameter modification policy and the second intrinsic parameter modification policy can be conveniently and quickly switched, so as to quickly construct a required camera intrinsic parameter. For example, it is assumed that the jth boundary camera in the M boundary cameras is a camera C1, and an mth boundary camera (m is a positive integer less than or equal to M) is a camera C2. When a boundary camera intrinsic parameter of the camera C1 is constructed, if a field value of a parameter derivation field corresponding to the camera C1 is set to a first derivation field value (for example, 0), it indicates that the boundary camera intrinsic parameter of the camera C1 cannot be derived from a boundary camera intrinsic parameter of another boundary camera (for example, the camera C2) in the boundary information data box. That is, the boundary camera intrinsic parameter of the camera C1 (including a camera identifier, a camera type field, photographing range field information, and camera depth information) may be designated separately, and the boundary camera intrinsic parameter of the camera C1 is different from the boundary camera intrinsic parameter of the camera C2 (or may have some same parameters). Conversely, if the field value of the parameter derivation field corresponding to the camera C1 is set to a second derivation field value (for example, 1), it indicates that the boundary camera intrinsic parameter of the camera C1 may be derived from the boundary camera intrinsic parameter of another boundary camera (for example, the camera C2) in the boundary information data box. For example, the camera C1 and the camera C2 may share a set of camera intrinsic parameters (except the camera identifier), that is, the camera type field, the photographing range field information, and the camera depth field information of the camera C2 may be determined as the boundary camera intrinsic parameters of the camera C1.

In some embodiments, the boundary camera intrinsic parameter may alternatively be determined by a second intrinsic parameter construction policy indicated by a camera type field of the jth boundary camera. It may be understood that, by setting the field value of the camera type field, a content region range associated with an attribute type represented by the field value may be quickly designated. For a non-boundary camera in the camera array, a corresponding camera intrinsic parameter may also be provided by using the foregoing first intrinsic parameter construction policy or second intrinsic parameter construction policy, which is not described herein. The attribute type represented by the camera type field of the jth boundary camera may include a projection type and a model type that are corresponding to the jth boundary camera, and may include the following attribute types: in a case that a field value of the camera type field is a first attribute type field value (for example, 0), a camera type field that has the first attribute type field value is used for indicating that the projection type corresponding to the jth boundary camera is an isometric columnar projection (that is, ERP projection) type; in a case that the field value of the camera type field is a second attribute type field value (for example, 1), a camera type field that has the second attribute type field value is used for indicating that the projection type corresponding to the jth boundary camera is a perspective projection type; in a case that the field value of the camera type field is a third attribute type field value (for example, 2), a camera type field with the third attribute type field value is used for indicating that the projection type corresponding to the jth boundary camera is an orthogonal projection type; in a case that the field value of the camera type field is a fourth attribute type field value (for example, 3), a camera type field that has the fourth attribute type field value is used for indicating that the model type corresponding to the jth boundary camera is a pinhole camera model type; and in a case that the field value of the camera type field is a fifth attribute type field value (for example, 4), a camera type field that has the fifth attribute type field value is used for indicating that the model type corresponding to the jth boundary camera is a fish-eye camera model type.

In this embodiment of this disclosure, when the model type corresponding to the jth boundary camera is the foregoing pinhole camera model type, photographing range field information corresponding to a jth boundary camera that has the pinhole camera model type may include a camera focal length of the jth boundary camera and an offset of a principal optical axis of the jth boundary camera in an image coordinate system. The camera focal length herein may include a first focal length component value and a second focal length component value, and the offset herein may include a first offset component value and a second offset component value. When the model type corresponding to the jth boundary camera is the foregoing fish-eye camera model type, photographing range field information corresponding to a jth boundary camera that has the fish-eye camera model type may include an offset of a principal optical axis of the jth boundary camera in an image coordinate system, and the offset herein may also include a first offset component value and a second offset component value.

It may be understood that, in this embodiment of this disclosure, a camera intrinsic parameter (for example, a boundary camera intrinsic parameter of a boundary camera) of a camera may be provided by using a camera intrinsic parameter structure (for example, IntCameraInfoStruct) of a free-view video. For ease of understanding, referring to Table 2, Table 2 is used for indicating syntax of a camera intrinsic parameter structure of a free-view video according to an embodiment of this disclosure.

TABLE 2

```
aligned(8) class IntCameraInfoStruct( ) {
    unsigned int(10) camera_id;
    unsigned int(1) inferred_camera_params;
    if(inferred_camera_params == 1){
    bit(5) reserved;
    }
    else{
        unsigned int(1) camera_depth_present;
        bit(1) reserved = 0;
        unsigned int(3) camera_type;
        if (camera_type == 0) {
        signed int(32) erp_horizontal_fov;
         signed int(32) erp_vertical_fov;
        }
        if (camera_type == 1) {
```

TABLE 2-continued

```
        signed int(32) perspective_horizontal_fov;
        unsigned int(8)[4] perspective_aspect_ratio;
        }
        if (camera_type == 2) {
        unsigned int(8)[4] ortho_aspect_ratio;
        unsigned int(8)[4] ortho_horizontal_size;
        }
        if (camera_type == 3) {
        unsigned int(8)[4] camera_focal_length_x;
        unsigned int(8)[4] camera_focal_length_y;
        unsigned int(8)[4] camera_principle_point_x;
        unsigned int(8)[4] camera_principle_point_y;
        }
        if (camera_type == 4) {
        unsigned int(8)[4] camera_principle_point_x;
        unsigned int(8)[4] camera_principle_point_y;
        }
        if (camera_depth_present){
        unsigned int(32) camera_near_depth;
      unsigned int(32) camera_far_depth;
        }
      }
    }
```

The camera intrinsic parameter structure shown in the foregoing Table 2 is constructed based on the foregoing first intrinsic parameter construction policy. A syntax meaning shown in the foregoing Table 2 is as follows: camera_id indicates a camera identifier corresponding to a window. When the field value of the parameter derivation field (that is, inferred_camera_params) is 0 (that is, the first derivation field value), it indicates that the camera corresponding to camera_id has a different camera intrinsic parameter from another camera. When the field value of the parameter derivation field is 1 (that is, the second derivation field value), it indicates that the camera corresponding to camera_id has a camera intrinsic parameter that is the same as another camera except the camera identifier. The depth parameter identifier field (that is, camera_depth_present) indicates whether the depth parameter of the camera is presented. When the field value of the depth parameter identifier field is 1 (that is, a third valid value), it indicates that a camera depth parameter exists. When the field value of the depth parameter identifier field is 0 (that is, a third invalid value), it indicates that no camera depth parameter exists. The camera type field (that is, camera_type) indicates a projection algorithm type (that is, a projection type) and a model type of a window camera, and a field value of the camera type field is 0 (that is, a first attribute type field value) indicates an isometric columnar projection (that is, an ERP projection); If a field value of the camera type field is 1 (that is, a second attribute type field value), perspective projection is represented. If the field value of camera_type is 2 (that is, a third attribute type field value), orthogonal projection is represented. If the field value of camera_type is 3 (that is, a fourth attribute type field value), it indicates a pinhole camera model. If the field value of camera type is 4 (that is, a fifth attribute type field value), it indicates a fish-eye camera model. The remaining values are reserved. erp_horizontal_fov indicates a longitude range in a horizontal direction of a window region in a unit of radian during the ERP projection. A value range of this field is $(0, 2\pi)$. erp_vertical_fov indicates a latitude range in a vertical direction of the window region in a unit of radian during the ERP projection. A value range of this field is $(0, \pi)$. perspective_horizontal_fov indicates the horizontal range of the window region is in a unit of radian during the perspective projection. A value range of this field is $(0, \pi)$. perspective_aspect_ratio indicates an aspect ratio (horizontal/vertical) of the window during the perspective projection. The value of this field is 32-bit floating point number. A parsing process complies with the IEEE 754 standard. ortho_aspect_ratio indicates an aspect ratio (horizontal/vertical) of the window during the orthogonal projection. The value of this field is 32-bit floating point number. A parsing process complies with the IEEE 754 standard. ortho_horizontal_size indicates a size in a horizontal direction of a window in a unit of meter during the orthogonal projection. A value of this field is a 32-bit floating point number. A parsing process complies with the IEEE 754 standard. camera_focal_length_x and camera_focal_length_y respectively indicate an x component (that is, the first focal length component value) and a y component (that is, the second focal length component value) of a camera focal length. camera_principle_point_x and camera_principle_point_y respectively indicate an x component (that is, the first offset component value) and a y component (that is, the second offset component value) that are offset by the principal optical axis of the camera in the image coordinate system. camera_near_depth and camera_far_depth respectively indicate near depth information (or distance) and far depth information (or distance) that are indicated by a near plane and a far plane of a visual cone associated with the camera, and a value of this field needs to be in a unit of $2^{16}$ meters.

Table 3 is used for indicating syntax of a camera intrinsic parameter structure of a free-view video according to an embodiment of this disclosure.

TABLE 3

```
  aligned(8) class IntCameraInfoStruct( ) {
      unsigned int(10) camera_id;
      unsigned int(1) camera_depth_present;
      bit(2) reserved = 0;
      unsigned int(3) camera_type;
      if (camera_type == 0) {
        signed int(32) erp_horizontal_fov;
        signed int(32) erp_vertical_fov;
      }
      if (camera_type == 1) {
        signed int(32) perspective_horizontal_fov;
        unsigned int(8)[4] perspective_aspect_ratio;
      }
      if (camera_type == 2) {
        unsigned int(8)[4] ortho_aspect_ratio;
        unsigned int(8)[4] ortho_horizontal_size;
      }
      if (camera_type == 3) {
        unsigned int(8)[4] camera_focal_length_x;
        unsigned int(8)[4] camera_focal_length_y;
        unsigned int(8)[4] camera_principle_point_x;
        unsigned int(8)[4] camera_principle_point_y;
      }
      if (camera_type == 4) {
        unsigned int(8)[4] camera_principle_point_x;
        unsigned int(8)[4] camera_principle_point_y;
      }
      if (camera_depth_present){
        unsigned int(32) camera_near_depth;
        unsigned int(32) camera_far_depth;
      }
    }
```

The camera intrinsic parameter structure shown in Table 3 is constructed based on the foregoing second intrinsic parameter construction policy. For semantics of the syntax shown in the foregoing Table 3, refer to semantics of the same part of the syntax shown in the foregoing Table 2. Different from the camera intrinsic parameter structure shown in the foregoing Table 2, although a parameter derivation field inferred_camera_params does not exist in the camera intrinsic parameter structure shown in Table 3, attribute types (that is, a projection type and a model type) of the camera are still reintegrated.

In this embodiment of this disclosure, a projection type and a model type of a camera are reintegrated into a camera intrinsic parameter structure. In addition, this embodiment of this disclosure may further provide multiple intrinsic parameter construction policies to construct a camera intrinsic parameter, and an appropriate intrinsic parameter construction policy may be selected according to an actual requirement, thereby improving flexibility and efficiency of constructing the camera intrinsic parameter.

Based on the foregoing content, when the field value of the boundary range field information is the second range field value, the server may construct a second scene boundary corresponding to the rendering region range, and a process thereof may be as follows: The server may perform deletion processing on initial size information in initial boundary field information (initial boundary information) based on a boundary construction policy in a case that the field value of the boundary range field information is the second range field value. In some embodiments, a boundary type field, a scene origin field, and a construction field information (construction information) used for indicating the rendering region range may be added to the initial boundary field information after the initial size information is deleted, so as to obtain updated boundary field information (updated boundary information) corresponding to the initial boundary field information, and further, the second scene boundary corresponding to the rendering region range may be constructed based on the updated boundary field information. The boundary type field is used for indicating a boundary type of the second scene boundary. The boundary type herein may include a hexahedron type, a sphere type, a cylinder type, and a hemispherical type. The scene origin field is used for indicating a scene origin of the second scene boundary.

In a case that a field value of the scene origin field is a first origin field value (for example, 0), a key position point that is in a three-dimensional Cartesian coordinate system and that is associated with the boundary type of the second scene boundary may be determined as the scene origin of the second scene boundary; and in a case that the field value of the scene origin field is a second scene origin field value (for example, 1), a default position point in the three-dimensional Cartesian coordinate system (for example, a coordinate origin (0, 0, 0) in the three-dimensional Cartesian coordinate system) may be determined as the scene origin of the second scene boundary. Any point in the three-dimensional Cartesian coordinate system may also be designated as the scene origin of the second scene boundary. If the field value of the boundary type field is a first boundary type field value (for example, 0), a boundary type field that has the first boundary type field value is used for indicating that the boundary type of the second scene boundary is the hexahedron type, and it is determined that the second scene boundary is a hexahedron, and construction field information corresponding to the hexahedron may include size information of the hexahedron. In this case, a key position point corresponding to the hexahedron may be a target vertex on a bottom surface of the hexahedron (for example, a vertex at a lower left corner of the bottom surface) or another point on the hexahedron. If the field value of the boundary type field is a second boundary type field value (for example, 1), a boundary type field that has the second boundary type field value is used for indicating that the boundary type of the second scene boundary is the sphere type, and it is determined that the second scene boundary is a sphere (or an ellipsoid). Construction field information corresponding to the sphere (or the ellipsoid) includes radius information of the sphere (or the ellipsoid) obtained after deletion processing is performed on initial sphere information of the sphere (or the ellipsoid). In this case, a key position point corresponding to the sphere (or the ellipsoid) may be a sphere center of the sphere (or the ellipsoid) or another point on the sphere. If the field value of the boundary type field is a third boundary type field value (for example, 2), a boundary type field that has the third boundary type field value is used for indicating that the boundary type of the second scene boundary is the cylinder type, and it is determined that the second scene boundary is a cylinder (or an elliptic cylinder), and construction field information corresponding to the cylinder (or the elliptical cylinder) includes size information of the cylinder (or the elliptical cylinder). The size information of the cylinder (or the elliptical cylinder) may include a radius of the cylinder (or the elliptical cylinder) in a first coordinate dimension, a radius of the cylinder (or the elliptical cylinder) in a second coordinate dimension, and height information of the cylinder (or the elliptical cylinder) in a third coordinate dimension. In this case, a key position point corresponding to the cylinder (or the elliptical cylinder) may be a center of a bottom surface of the cylinder (or the elliptical cylinder) or another point on the cylinder (or the elliptical cylinder). If the field value of the boundary type field is a fourth boundary type field value (for example, 3), a boundary type field that has the fourth boundary type field value is used for indicating that the boundary type of the second scene boundary is the hemispherical type, and it is determined that the second scene boundary is a hemispherical body, where construction field information corresponding to the hemispherical body includes a plane normal vector corresponding to the hemispherical body and size information corresponding to the hemispherical body. In this case, a key position point corresponding to the hemispherical body may be a center of a bottom surface of the hemispherical body or another point on the hemispherical body.

In this embodiment of this disclosure, a cylinder type is added, thereby enriching boundary types of a scene boundary.

In this embodiment of this disclosure, the second scene boundary may be constructed by using a three-dimensional boundary structure (for example, a 3DBoundingBoxStruct) of a free-view video. For ease of understanding, referring to Table 4, Table 4 is used for indicating syntax of a three-dimensional boundary structure of a free-view video according to an embodiment of this disclosure.

TABLE 4

```
aligned(8) class 3DBoundingBoxStruct( ) {
    unsigned int(7) bounding_space_type;
    unsigned int(1) default_origin_point;
    if(bounding_space_type == 0){
    if(default_origin_point == 0){
        3DPoint origin_point( );
    }
    CuboidRegionStruct cubic_region( );
    }
    if(bounding_space_type == 1){
    if(default_origin_point == 0){
        3DPoint origin_point( );
    }
    SpheroidStruct sphere_region( );
    }
    if(bounding_space_type == 2){
    if(default_origin_point == 0){
```

TABLE 4-continued

```
    3DPoint origin_point( );
    }
    CylinderStruct cylinder_region( );
  }
  if(bounding_space_type == 3){
  if(default_origin_point == 0){
    3DPoint origin_point( );
    }
    HalfspaceStruct halfspace_region( );
  }
}
```

The three-dimensional boundary structure deletes initial size information (that is, size information indicated by bb_dx, bb_dy, and bb_dz, which is not written in the foregoing Table 4). Semantics of the syntax shown in the foregoing Table 4 is as follows: A boundary type field (that is, bounding_spacer_type) indicates a boundary type of a scene boundary. For a value meaning of the boundary type field, refer to Table 5. Table 5 is used for indicating a value meaning of the boundary type field provided in this embodiment of this disclosure.

TABLE 5

| Value of bounding_space_type | Meaning |
| --- | --- |
| 0 (that is, a first boundary type field value) | A scene boundary is a hexahedron, and in this case, a lower left corner vertex of a bottom surface of the hexahedron is used as an origin. |
| 1 (that is, a second boundary type field value) | A scene boundary is a sphere or an ellipsoid, and in this case, a sphere center is used as an origin. |
| 2 (that is, a third boundary type field value) | A scene boundary is a cylinder or an elliptical cylinder. In this case, a center of a bottom surface of the cylinder is used as an origin. |
| 3 (that is, a fourth boundary type field value) | A scene boundary is a hemispherical body, and in this case, a center of a bottom surface of the hemispherical body is used as an origin. |

Referring to the foregoing Table 4 again, when the field value of the scene origin field (that is, default_origin_point) is 0 (that is, the first origin field value), it indicates that the scene boundary uses a designated point (for example, a key position point associated with the boundary type) as the scene origin. When the field value of the scene origin field is 1 (that is, the second origin field value), it indicates that the scene boundary uses the coordinate origin (0, 0, 0) (that is, the default position point in the three-dimensional Cartesian coordinate system) as the scene origin. origin_point indicates coordinates of the key position point in the three-dimensional Cartesian coordinate system. In this embodiment of this disclosure, the key position point may be designated by using a three-dimensional position structure (for example, 3DPoint) of a free-view video. For ease of understanding, refer to Table 6. Table 6 is used for indicating syntax of a three-dimensional position structure of a free-view video according to an embodiment of this disclosure.

TABLE 6

```
aligned(8) class 3DPoint( ) {
    unsigned int(16) x;
    unsigned int(16) y;
    unsigned int(16) z;
    }
```

Semantics of the syntax shown in the foregoing Table 6 is as follows: x, y, and z respectively indicate x, z, and y coordinate values of a 3D point (for example, the key position point) in the three-dimensional Cartesian coordinate system.

Referring to the foregoing Table 4 again, the construction field information (that is, cubic region) corresponding to the hexahedron indicates size information when the second scene boundary is a hexahedron. In this embodiment of this disclosure, the size information of the hexahedron may be indicated by using a hexahedron structure (for example, CuboidRegionStruct) of a free-view video. For ease of understanding, refer to Table 7 together. Table 7 is used for indicating syntax of a hexahedron structure of a free-view video according to an embodiment of this disclosure.

TABLE 7

```
aligned(8) class CuboidRegionStruct( ) {
    unsigned int(16) cuboid_dx;
    unsigned int(16) cuboid_dy;
    unsigned int(16) cuboid_dz;
    }
```

Semantics of the syntax shown in the foregoing Table 7 is as follows: cuboid_dx, cuboid_dy, and cuboid_dz respectively represent sizes of a sub-region of a cuboid in the three-dimensional Cartesian coordinate system relative to an anchor (for example, a vertex at a lower left corner of a bottom surface of the cuboid) along x, y, and z axes.

Referring to the foregoing Table 4 again, the construction field information (that is, sphere_region) corresponding to the sphere indicates radius information when the second scene boundary is a sphere. In this embodiment of this disclosure, a sphere structure (for example, SpheroidStruct) of a free-view video may be used for indicating the radius information of the sphere. For ease of understanding, referring to Table 8, Table 8 is used for indicating syntax of a sphere structure of a free-view video according to an embodiment of this disclosure.

TABLE 8

```
aligned(8) class SpheroidStruct( ) {
    unsigned int (32) radius_x;
    unsigned int (32) radius_y;
    unsigned int (32) radius_z;
    }
```

Semantics of the syntax shown in the foregoing Table 8 is as follows: radius_x, radius_y, and radius_z respectively indicate radii of the sphere in the x, y, and z dimensions. The sphere structure deletes initial sphere center information, that is, a sphere center position indicated by a point when a field value of camera_inferred_flag is 0 (not written in the foregoing Table 8).

Referring to Table 4 again, the construction field information (that is, cylinder_region) corresponding to the cylinder indicates size information when the second scene boundary is a cylinder. In this embodiment of this disclosure, the size information of the cylinder may be indicated by using a cylinder structure (for example, CylinderStruct) of a free-view video. For ease of understanding, refer to Table 9, and Table 9 is used for indicating syntax of a cylinder structure of a free-view video according to an embodiment of this disclosure.

TABLE 9

```
aligned(8) class CylinderStruct( ) {
    unsigned int (32) radius_x;
    unsigned int (32) radius_y;
    unsigned int (32) height;
}
```

Semantics of the syntax shown in the foregoing Table 9 is as follows: radius_x, radius_y, and height respectively indicate a radius of the cylinder on the x dimension (that is, the first coordinate dimension), a radius on the y dimension (that is, the second coordinate dimension), and a height on the z dimension (that is, the third coordinate dimension).

Referring to the foregoing Table 4 again, the construction field information (that is, halfspace_region) corresponding to the hemispherical body indicates the plane normal vector and the size information when the second scene boundary is a hemispherical body. In this embodiment of this disclosure, the plane normal vector and the size information of the hemispherical body may be indicated by using a hemispherical structure (for example, HalfspaceStruct) of a free-view video. For ease of understanding, refer to Table 10 together. Table 10 is used for indicating syntax of a hemispherical structure of a free-view video according to this embodiment of this disclosure.

TABLE 10

```
aligned(8) class HalfspaceStruct( ) {
    signed int(32) normal_x;
    signed int(32) normal_y;
    signed int(32) normal_z;
    unsigned int (32) distance;
}
```

Semantics of the syntax shown in the foregoing Table 10 is as follows: normal_x, normal_y, and normal_z jointly indicate the plane normal vector of the hemispherical body. distance indicates the distance from the origin along the normal vector to the hemispherical plane (i.e., the size information of the hemispherical body). The cross-boundary processing field information of the jth boundary camera may include a cross-boundary attribute field.

In some embodiments, when the field value of the cross-boundary attribute field is a first attribute field value (e.g., 0), a cross-boundary attribute field that has the first attribute field value is used for indicating that video content in a first virtual window region may be displayed for the service object on the video client when the video content associated with the object behavior of the service object exceeds the rendering region. The first virtual window region is a window region corresponding to a first virtual camera, the first virtual camera may be located at a scene origin of a scene boundary, an orientation of the first virtual camera is a default orientation, and the first virtual camera does not belong to the camera array. When the field value of the cross-boundary attribute field is a second attribute field value (for example, 1), a cross-boundary attribute field that has the second attribute field value is used for indicating that when the video content associated with the object behavior of the service object exceeds the rendering region range, video content in a content region range corresponding to a target camera indicated by a target camera identifier may be displayed on the video client for the service object, and the target camera herein belongs to the camera array. When the field value of the cross-boundary attribute field is a third attribute field value (e.g., 2), a cross-boundary attribute field that has the third attribute field value is used for indicating that video content in a second virtual window region may be displayed for the service object on the video client when the video content associated with the object behavior of the service object exceeds the rendering region. The second virtual window region herein is a window region corresponding to a second virtual camera. Position information and orientation information of the second virtual camera may be designated by using a virtual camera designation policy (for example, by using the camera extrinsic parameter structure shown in the foregoing Table 1). The second virtual camera does not belong to the camera array.

The cross-boundary processing field information of the jth boundary camera is determined by a cross-boundary construction policy. The cross-boundary construction policy may include a first cross-boundary construction policy and a second cross-boundary construction policy, where the first cross-boundary construction policy is used for indicating that the jth boundary camera and a remaining boundary camera have different cross-boundary processing field information, and the second cross-boundary construction policy is used for indicating that the jth boundary camera and the remaining boundary camera have the same cross-boundary processing field information. Herein the remaining boundary camera is a boundary camera other than the jth boundary camera in the M boundary cameras. In this way, by using different cross-boundary construction policies, corresponding cross-boundary processing field information may be quickly constructed for multiple boundary cameras.

It may be understood that, in this embodiment of this disclosure, the boundary metadata information of the free-view video may be provided by using a boundary information data box (for example, AvsFreeViewfloundaryflox) of the free-view video. Referring to Table 11, Table 11 is used for indicating syntax of a boundary information data box of a free-view video according to an embodiment of this disclosure.

TABLE 11

```
aligned(8) class AvsFreeViewBoundaryBox extends FullBox('a3fb'){
    unsigned int(8) boundary_camera_count;
    for(j=1; j<= boundary_camera_count; j++){
        unsigned int(10) camera_id;
        bit(6) reserved;
        ExtCameraInfoStruct( ) boundary_camera_position;
        IntCameraInfoStruct( ) boundary_camera_region;
    // unsigned int(8) boundary_exceeded_switch
    // if(boundary_exceeded_switch == 1){
        //unsigned int(16) dest_camera_id;
    //}
    //if(boundary_exceeded_switch == 2){
        // ExtCameraInfoStruct dest_virtual_camera( );
    //}
}
```

TABLE 11-continued

```
    unsigned int(1) boundary_space_present;
    unsigned int(3) boundary_exceeded_switch;// A switching behavior
when the scene boundary is exceeded may be set for each boundary
camera.
    bit(4) reserved;
    if(boundary_space_present == 1){
    3DBoundingBoxStruct boundary_space( );
    }
    if(boundary_exceeded_switch == 1){
    unsigned int(16) dest_camera_id;
    }
    if(boundary_exceeded_switch == 2){
    ExtCameraInfoStruct dest_virtual_camera( );
    }
}
```

Semantics of the syntax shown in the foregoing Table 11 is as follows: The boundary camera count field (i.e., boundary_camera_count) is used for indicating a quantity of boundary cameras that constitute the scene boundary of the free-view video; and camera_id indicates the camera identifier of the boundary camera. When information such as a position, an orientation, a window region, and the like of the boundary camera is already provided in a later described updated free-view information data box (for example, AvsFreeViewInfoBox), the camera parameter field information of the boundary camera may be determined only by using the camera identifier. Otherwise, the position, orientation, and corresponding window region information of the boundary camera may be indicated by using the boundary camera extrinsic parameter (boundary_camera_position, including the position information and the orientation information of the boundary camera, which may be designated by using the camera extrinsic parameter structure shown in the foregoing Table 1) and the boundary camera intrinsic parameter (boundary_camera_region, including the camera identifier of the boundary camera and the corresponding window region information, which may be designated by using the camera intrinsic parameter structure shown in the foregoing Table 2 or Table 3). reserved is reserved byte. When the field value of the boundary range field information (that is, boundary_space_present) is 0 (that is, the first range field value), it indicates that the scene boundary is determined by a parameter of the boundary camera, that is, the content region range photographed by the boundary camera forms the scene boundary; and when the field value of boundary_space_present is 1 (that is, the second range field value), it indicates that the scene boundary is determined by boundary_space. boundary_space indicates the rendering region range associated with the boundary type (i.e., the region range of the second scene boundary). If the region range corresponding to boundary_space is greater than the region range formed by the boundary camera, the video client may render, according to content photographed by the boundary camera, a region that exceeds the content region range photographed by the boundary camera. The cross-boundary attribute field (that is, boundary_exceeded_switch) indicates a processing method (that is, the cross-boundary processing field information) when the object behavior of the service object exceeds the scene boundary: When the field value of the cross-boundary attribute field is 0 (that is, the first attribute field value, which is not written in the foregoing Table 11), it indicates that a virtual window region (that is, the first virtual window region) that is based on an origin and whose orientation is (0, 0, 0) (that is, the default orientation) is to be rendered for the service object. When the field value of the cross-boundary attribute field is 1 (that is, the second attribute field value), it indicates that the content region range photographed by the camera (that is, the target camera) corresponding to the target camera identifier (that is, dest_camera_id) is to be rendered for the service object. When the field value of the cross-boundary attribute field is 2 (that is, the third attribute field value), it indicates that a virtual window region (that is, the second virtual window region) that is based on a position and an orientation designated by dest_virtual_camera is to be rendered for the service object. It may be learned from the foregoing Table 11 that, when determining the cross-boundary processing field information by using the first cross-boundary construction policy, annotation code in the for loop statement shown in the foregoing Table 11 may be restored (that is, the annotation symbol is removed), and the same code outside the for loop statement is deleted. That is, different cross-boundary processing field information may be successively indicated for each boundary camera by using the for loop statement, and a corresponding switching behavior that exceeds the scene boundary is set for each boundary camera. When determining the cross-boundary processing field information by using the second cross-boundary construction policy, the syntax shown in the foregoing Table 11 may be directly used (that is, code outside the for loop statement), so that the same cross-boundary processing field information may be indicated for each boundary camera.

In addition to the boundary information data box, this embodiment of this disclosure further provides an extended updated free-view information data box. That is, the extended data box further includes an updated free-view information data box corresponding to the free-view video. For example, the server may perform deletion processing on the model type field (that is, camera_model in the initial free-view information data box) carried in the initial free-view information data box corresponding to the free-view video, the camera position information (that is, camera_pos_x, camera_pos_y, camera_pos_z in the initial free-view information data box) and the camera focal length information (that is, camera_focal_length_x, camera_focal_length_y in the initial free-view information data box) that are respectively corresponding to each camera in the camera array. In some embodiments, a camera extrinsic parameter and a camera intrinsic parameter may be added to each camera in the initial free-view information data box obtained after deletion processing, to obtain the updated free-view information data box. The information carried in the updated free-view information data box may be determined as free-view metadata information that is used for indicating a view included in a track of the free-view video. For ease of understanding, subsequently, the ith camera and the kth camera in the camera array are used as examples for description, where k is a positive integer less than or equal to N, and i is not equal to k.

In some embodiments, the foregoing updated free-view information data box is determined by the first data box construction policy indicated by the camera parameter duplication field. In this case, the server may add the camera parameter duplication field to the initial free-view information data box obtained after deletion processing, add a first camera extrinsic parameter to the ith camera in the camera array, and add a second camera extrinsic parameter to the kth camera in the camera array. If a field value of the camera parameter duplication field is a first duplication field value (for example, 1), it may be determined that the first data box construction policy includes a first data box modification policy, so that the first camera parameter may be added to the ith camera based on the first data box modification policy, and the second camera parameter may be added to the kth camera. The updated free-view information data box may be obtained based on the added first camera extrinsic parameter, the added second camera extrinsic parameter, the added first camera intrinsic parameter, and the added second camera intrinsic parameter. The first camera intrinsic parameter and the second camera intrinsic parameter include the same parameter information except the camera identifier, and both the first camera intrinsic parameter and the second camera intrinsic parameter are determined by the foregoing second intrinsic parameter construction policy, for example, may be constructed by using the foregoing camera intrinsic parameter structure shown in Table 3. If the field value of the camera parameter duplication field is a second duplication field value (for example, 0), it may be determined that the first data box construction policy includes a second data box modification policy, and further, a third camera intrinsic parameter may be added to the ith camera based on the second data box modification policy, and a fourth camera intrinsic parameter may be added to the kth camera. In some embodiments, the updated free-view information data box may be obtained based on the added first camera extrinsic parameter, the added second camera extrinsic parameter, the added third camera intrinsic parameter, and the added fourth camera intrinsic parameter. The third camera intrinsic parameter and the fourth camera intrinsic parameter include different parameter information, and both the third camera intrinsic parameter and the fourth camera intrinsic parameter are determined by the foregoing second intrinsic parameter construction policy, for example, may be constructed by using the camera intrinsic parameter structure shown in Table 3.

In some embodiments, the foregoing updated free-view information data box is determined by a second data box construction policy. The server may add, based on the second data box construction policy, a third camera extrinsic parameter to the ith camera in the camera array and a fourth camera extrinsic parameter to a kth camera in the camera array in the initial free-view information data box obtained after deletion processing. In addition, a fifth camera intrinsic parameter may be added to the ith camera, and a sixth camera intrinsic parameter may be added to the kth camera. The updated free-view information data box may be obtained based on the added third camera extrinsic parameter, the added fourth camera extrinsic parameter, the added fifth camera intrinsic parameter, and the added sixth camera intrinsic parameter. Both the fifth camera intrinsic parameter and the sixth camera intrinsic parameter are determined by the foregoing first intrinsic parameter construction policy, for example, may be constructed by using the foregoing camera intrinsic parameter structure shown in Table 2.

It may be understood that this embodiment of this disclosure may provide free-view metadata information of the free-view video by using an updated free-view information data box (for example, AvsFreeViewInfoBox) of the free-view video. For ease of understanding, refer to Table 12, where the table 12 is used for indicating syntax of an updated free-view information data box of a free-view video provided in this embodiment of this disclosure.

TABLE 12

```
aligned(8) class AvsFreeViewInfoBox extends FullBox('afvi'){
    unsigned int(8) codec_independency;
    unsigned int(8) texture_padding_size;
    unsigned int(8) depth_padding_size;
    unsigned int(8) camera_count;
```

TABLE 12-continued

```
    unsigned int(1) duplicated_camera_params;
    bit(7) reserved;
    for(i=1; i<=camera_count; i++){
        ExtCameraInfoStruct( );
        if(duplicated_camera_params == 1){
        if(i==1){
            IntCameraInfoStruct( );
        }
        else{
            unsigned int(10) camera_id;
            bit(6) reserved;
        }
    }
    else{
    IntCameraInfoStruct( );
    }
    unsigned int(32) camera_resolution_x;
    unsigned int(32) camera_resolution_y;
    unsigned int(8) depth_downsample_factor;
    unsigned int(32) texture_vetex_x;
    unsigned int(32) texture_vetex_y;
    unsigned int(32) depth_vetex_x;
    unsigned int(32) depth_vetex_y;
    }
}
```

Semantics of the syntax shown in the foregoing Table 12 is as follows: A codec independent identifier field (that is, codec_independency) indicates codec independency between a texture map and a depth map that are corresponding to each camera in a track. When a field value of the codec independent identifier field is 0 (that is, a first independent identifier field value), it indicates that a texture map or a depth map corresponding to a single camera relies on a texture map and a depth map corresponding to another camera when codec is performed. When the field value of the codec independent identifier field is 1 (that is, a second independent identifier field value), it indicates that a texture map corresponding to a single camera relies on a texture map corresponding to another camera when codec is performed, and a depth map corresponding to a single camera relies on a depth map corresponding to another camera when codec is performed. The remaining values are reserved. texture_padding_size indicates a guard band width of a texture map. depth_padding_size indicates a guard band width of a depth map. A camera count field (i.e. camera_count) indicates a quantity of all cameras that collect a video. When a field value of a camera parameter duplication field (that is, duplicated_camera_params) is 1 (that is, a first duplication field value), it indicates that camera intrinsic parameters of all cameras indicated in AvsFreeViewInfoBox are the same except camera_id. If the field value of the camera parameter duplication field is 0 (that is, a second duplication field value), it indicates that the camera indicated in AvsFreeViewInfoBox has a different camera intrinsic parameter. ExtCameraInfoStruct indicates a camera extrinsic parameter. IntCameraInfoStruct indicates a camera intrinsic parameter. In this case, the camera intrinsic parameter herein is determined by using the foregoing second intrinsic parameter construction policy. camera_id indicates a camera identifier corresponding to each view. camera_resolution_x and camera_resolution_y respectively indicate a resolution width and height of the texture map and the depth map that are collected by the camera. depth_downsample_factor indicates a multiple factor of downsampling of the depth map, and an actual resolution width and height of the depth map is ½ of a width and a height of a camera collection resolution. texture_vetex_x and texture_vetex_y respectively indicate x and y component values of an offset of an upper-left vertex of the texture map relative to a plane frame origin (the upper-left vertex of the plane frame). depth_vetex_x and depth_vetex_y respectively indicate x and y component values of an offset of an upper-left vertex of the depth map relative to the plane frame origin (the upper-left vertex of the plane frame). Refer to Table 13, where the table 13 is used for indicating syntax of an updated free-view information data box of a free-view video provided in this embodiment of this disclosure.

TABLE 13

```
aligned(8) class AvsFreeViewInfoBox extends FullBox('afvi'){
    unsigned int(8 codec__independency;
    unsigned int(8) texture__padding__size;
    unsigned int(8) depth__padding__size;
    unsigned int(8) camera__count;
    for(i=1; i<=camera__count; i++)
        ExtCameraInfoStruct( );
        IntCameraInfoStruct( );
        signed int(32) camera__focal__length__x;
        signed int(32) camera__focal__length__y;
        unsigned int(32) camera__resolution__x;
        unsigned int(32) camera__resolution__y;
        unsigned int(8) depth__downsample__factor;
        unsigned int(32) texture__vetex__x;
        unsigned int(32) texture__vetex__y;
        unsigned int(32) depth__vetex__x;
        unsigned int(32) depth__vetex__y;
    }
}
```

A semantic meaning of the syntax shown in Table 13 is different from the semantic meaning of the syntax shown in Table 12. The camera parameter IntCameraInfoStruct in Table 13 is determined by the foregoing first intrinsic parameter construction policy. In addition, for semantics of another field, refer to semantics of the same part of syntax shown in Table 12.

Step S103: Perform encapsulation processing on the encoded video bitstream based on the extended data box to determine a video media file of the free-view video. For example, encapsulation processing is performed on the encoded video bitstream and the extended data box to obtain a video media file of the free-view video including the boundary metadata information.

In this embodiment of this disclosure, the server may perform encapsulation processing on the encoded video bitstream based on the extended data box, so as to determine the video media file of the free-view video. In this embodiment of this disclosure, encapsulation processing may be performed in a file container by using a specific encapsulation format (for example, ISOBMFF), so as to form a video media file in the file container according to the encapsulation format by using the metadata information and the encoded video bitstream that are carried in the extended data box.

Step S104: Deliver the video media file to a video client, so that in a case that the extended data box is obtained based on the video media file, the video client obtains the spliced texture map and depth map associated with the ith camera, and in a case of determining that the ith camera is a boundary camera, render, on the video client, video content in the scene boundary indicated by the boundary metadata information. For example, the video media file is delivered to a video client, enabling the video client to determine that the ith camera is a boundary camera, and to render video content in the scene boundary indicated by the boundary metadata information.

In this embodiment of this disclosure, the server may deliver the encapsulated video media file to the video client by using a transmission protocol (for example, DASH), so that in a case that the extended data box is obtained based on the video media file, the video client obtains the spliced texture map and depth map associated with the ith camera, and in a case of determining that the ith camera is a boundary camera, render, on the video client, video content in the scene boundary indicated by the boundary metadata information. For a processing process of the video client, refer to a subsequent embodiment corresponding to FIG. 8.

It can be learned from the forgoing that, in a file encapsulation process, the embodiments of this disclosure may provide boundary metadata information, and the boundary metadata information may be added to a corresponding video media file, so that the video client can determine, according to the boundary metadata information, a scene boundary of a renderable free-view video, and then render and present corresponding video content in the scene boundary, thereby improving quality of video rendering in the scene boundary. In addition, the initial free-view information data box is further optimized in this embodiment of this disclosure, to obtain the updated free-view information data box. The free-view metadata information provided by the updated free-view information data box can facilitate indication of view information corresponding to the track of the free-view video, thereby improving metadata indication efficiency.

In some embodiments, referring to FIG. 8, FIG. 8 is a schematic flowchart of another video data processing method according to an embodiment of this disclosure. The method may be performed by a decoding device (for example, the decoding device 200B in the embodiment corresponding to FIG. 2) in a free-view video system. The decoding device may be a user terminal integrated with the foregoing video client. The method may include at least the following steps:

Step S201: Obtain, in a case that a video media file of a free-view video delivered by a server is obtained, an extended data box based on the video media file, and determine a spliced texture map and depth map that are associated with an ith camera in a camera array.

In this embodiment of this disclosure, the video client may receive the video media file of the free-view video delivered by the server, and further may perform decapsulation processing on the video media file, so as to obtain the extended data box and the corresponding encoded video bitstream, and further may perform decoding processing on the encoded video bitstream based on metadata information provided by the extended data box, so as to obtain the spliced texture map and depth map that are associated with the ith camera in the camera array. The extended data box includes boundary metadata information. For a process of generating the video media file by the server, refer to the foregoing embodiment corresponding to FIG. 7. Details are not described herein again.

Step S202: Render, on the video client in a case of determining that the ith camera is a boundary camera, video content in the scene boundary indicated by the boundary metadata information.

In this embodiment of this disclosure, the video client may determine, in spliced texture maps and depth maps that are associated with multiple cameras, a texture map and a depth map (that is, a target spliced image) that are used for synthesized rendering, and may perform selection based on object position information of a service object and camera position information of each camera. For example, a spliced texture map and depth map associated with a camera whose distance to a service object is less than a distance threshold may be determined as a target spliced image. It is assumed that the camera corresponding to the determined target spliced image includes the ith camera, it may be determined whether the ith camera is a boundary camera, and if the ith camera is a boundary camera, video content in a scene boundary indicated by the boundary metadata information may be rendered on the video client side.

In an implementation, the scene boundary includes a first scene boundary and a second scene boundary. The first scene boundary is determined based on a content region range photographed by each boundary camera in the camera array, and the second scene boundary is determined based on a boundary construction policy. Assuming that a region range corresponding to the second scene boundary is greater than a region range corresponding to the first scene boundary, the region range corresponding to the second scene boundary refers to a rendering region range when the second scene boundary is rendered.

In this embodiment of this disclosure, when determining that the ith camera is a boundary camera, the video client may obtain an object behavior of a service object associated with the free-view video. The object behavior may include any interaction behavior between the service object and the free-view video, including but not limited to a zooming behavior (for example, zooming in/out a picture size), a switching behavior (for example, switching video content), and a position interaction behavior (for example, adjusting a viewing direction).

If the video content associated with the object behavior exceeds the content region range photographed by the ith camera and does not exceed the rendering region range, the video content in the content region range photographed by the ith camera may be rendered on the video client based on the spliced texture map and depth map associated with the ith camera. If the video content associated with the object behavior exceeds the rendering region, cross-boundary processing field information of the ith camera may be obtained from the boundary metadata information, and video content associated with the cross-boundary processing field information may be rendered on the video client. For a meaning of the cross-boundary processing field information, refer to the foregoing embodiment corresponding to FIG. 7.

In an implementation, the server generates an encoded video bitstream A1 of the free-view video, encapsulates the encoded video bitstream A1 into a video media file A2, and may add, according to information such as a camera parameter during video shooting from the free-view video, metadata information related to the scene boundary to the video media file A2. For example, the metadata information may include: identifying a boundary camera (for example, Camera1, Camera2, and Camera3) and information such as a position and an orientation of the boundary camera that constitute a scene boundary;

{Camera1:ID=1;Pos=(100,0,100);orientation=(0,0,0)}

{Camera2:ID=2;Pos=(100,100,100);orientation=(0.5, 0.5,0)}

{Camera3:ID=3;Pos=(0,0,100);orientation=(0.5,0.5,– 0.5)}

ID indicates a camera identifier, Pos indicates a position of the camera, and orientation indicates an orientation of the camera.

The metadata information may further include: indicating a content region range photographed by the boundary camera:

Camera1, Camera2, and Camera3: camera_type==1;

perspective_horizontal_fov=180; perspective_ aspect_ratio=1.

camera_type indicates an attribute type of the camera, and when a value is 1, it indicates that the camera uses perspective projection. perspective_horizontal_fov indicates a horizontal range of a window region during perspective projection, and perspective_aspect_ratio indicates an aspect ratio (horizontal/vertical) of the window during perspective projection.

The metadata information may further include: indicating a region range of the scene boundary and a processing manner when the scene boundary is exceeded.

boundary_space_present=0; boundary_ exceeded_switch=2;

dest_virtual_camera:{Pos=(0,100,100);orientation=(0, 0,0)}.

boundary_space_present is boundary range field information, and when a value is 0, it indicates that a content region range photographed by a boundary camera constitutes a scene boundary. boundary_exceeded_switch is a cross-boundary attribute field. When a value is 2, it indicates that a virtual window region (that is, a second virtual window region) that is based on a position designated by dest_virtual_camera (for example, Pos=(0, 100, 100)) and an orientation (for example, orientation=(0, 0, 0)) is rendered for the service object.

In some embodiments, the server may transmit the video media file A2 to the video client, and the video client may determine the target spliced image for synthesized rendering. Assuming the spliced image corresponding to Camera1 and Camera10, it may be determined whether Camera1 and Camera10 are boundary cameras. It can be learned from the foregoing that Camera1 is a boundary camera, and in this case, a content region range photographed by the boundary camera forms a renderable scene boundary (boundary_space_present=0). Therefore, the video client may determine, according to an object behavior of the service object, whether video content viewed by the service object exceeds a content region range photographed by Camera1. If the video content viewed by the service object exceeds the content region range photographed by Camera1, a view of the service object may be adjusted to a virtual camera position (that is, a second virtual camera) having a position and an orientation {Pos=(0, 100, 100); orientation=(0,0,0)}, and this position is used as a basis for subsequent rendering.

In an implementation, the server generates an encoded video bitstream B1 of the free-view video, encapsulates the encoded video bitstream B1 into a video media file B2, and may add, according to information such as a camera parameter during video shooting from the free-view video, metadata information related to the scene boundary to the video media file B2. For example, the metadata information may include: identifying a boundary camera (for example, Camera1, Camera2, and Camera3) and information such as a position and an orientation of the boundary camera that constitute a scene boundary;

> {Camera1:ID=1;Pos=(100,0,100);orientation=(0,0,0)}
>
> {Camera2:ID=2;Pos=(100,100,100);orientation=(0.5, 0.5,0)}
>
> {Camera3:ID=3;Pos=(0,0,100);orientation=(0.5,0.5,– 0.5)}

The metadata information may further include: indicating a content region range photographed by the boundary camera; and > Camera1, Camera2, and Camera3: camera_type==1; perspective_horizontal_fov=180; perspec- tive_aspect_ratio=1.

The metadata information may further include: indicating a region range of the scene boundary and a processing manner when the scene boundary is exceeded.

> boundary_space_present=1; bounding_space_type=0;
>
> cubic_region:{point=(0,0,–1000),dx=dy=dz=1000}; boundary_exceeded_switch=2;
>
> dest_virtual_camera:{Pos=(0,100,100);orientation=(0, 0,0)}.

When the value of boundary_space_present is 1, it indicates that the scene boundary is a constructed second scene boundary. bounding_space_type is a boundary type field. When a value is 0, it indicates that the constructed second scene boundary is a hexahedron, and cubic_region indicates size information when the second scene boundary is a hexahedron.

In some embodiments, the server may transmit the video media file B2 to the video client, and the video client may determine the target spliced image for synthesized rendering. Assuming the spliced image corresponding to Camera1 and Camera10, it may be determined whether Camera1 and Camera10 are boundary cameras. It may be learned from the foregoing that, Camera1 is a boundary camera, and in this case, the scene boundary is a region (boundary_space_present=1; bounding_space_type=0) formed by a hexahedron, and the scene boundary is a hexahedron whose bottom left lower vertex is (0, 0, –1000) and whose length, width, and height are all 1000. Therefore, the video client may determine, according to the object behavior of the service object, whether the video content viewed by the service object exceeds a content region range photographed by Camera1 and a range of the scene boundary (that is, the region formed by the hexahedron). If the content region range photographed by Camera1 is exceeded, but the range of the scene boundary is not exceeded, the video client may render a corresponding picture region according to the content photographed by the boundary camera. If the range of the scene boundary is exceeded, the view of the service object may be adjusted to a virtual camera position having a position and an orientation {Pos=(0, 100, 100); orientation=(0,0,0)}, and this position is used as a basis for subsequent rendering.

It may be learned from the foregoing that, after determining the target spliced image used for synthesized rendering, the video client determines, based on the boundary metadata information, whether the corresponding camera is a boundary camera. Because a related free-view video processing procedure includes a step of determining the target spliced image and a corresponding camera, in this embodiment of this disclosure, use of the boundary metadata information may be naturally integrated with the related free-view video processing procedure, so that the video data processing method provided in this embodiment of this disclosure is more compatible with the related free-view video processing procedure. In addition, the video client can determine, according to the boundary metadata information, a scene boundary of a renderable free-view video, and then render and present corresponding video content in the scene boundary, thereby improving quality of video rendering in the scene boundary.

In some embodiments, referring to FIG. 9, FIG. 9 is a schematic flowchart of still another video data processing method according to an embodiment of this disclosure. The method may be performed jointly by an encoding device (for example, the encoding device 200A in the embodiment corresponding to FIG. 2) and a decoding device (for example, the decoding device 200B in the embodiment corresponding to FIG. 2) in a free-view video system. For example, the encoding device may be a server, the decoding device may be a user terminal integrated with a video client, and the method may include at least the following steps:

Step S301: The server collects multiple images obtained by using an ith camera in a camera array, and determines a texture map and a depth map that are used for performing image splicing.

Step S302: The server performs image splicing on the texture map and the depth map that are obtained in step S301 to obtain a spliced texture map and depth map.

Step S303: The server determines, based on the spliced texture map and depth map, an encoded video bitstream for constructing a free-view video.

Step S304: The server obtains boundary metadata information for indicating a scene boundary of the free-view video.

Step S305: The server adds the boundary metadata information to a file encapsulation data box corresponding to the free-view video, to obtain an extended data box corresponding to the file encapsulation data box.

Step S306: The server performs encapsulation processing on the encoded video bitstream based on the extended data box to obtain a video media file of the free-view video.

Step S307: The server delivers the video media file to the video client.

Step S308: When obtaining the extended data box based on the video media file, the video client obtains the spliced texture map and depth map that are associated with the ith camera.

Step S309: The video client renders, on the video client in a case of determining that the ith camera is a boundary camera, video content in the scene boundary indicated by the boundary metadata information.

For an implementation process of step S301 to step S307, refer to descriptions in the embodiment corresponding to FIG. 7. For an implementation process of step S308 and step S309, refer to descriptions in the embodiment corresponding to FIG. 8.

Figure 10:
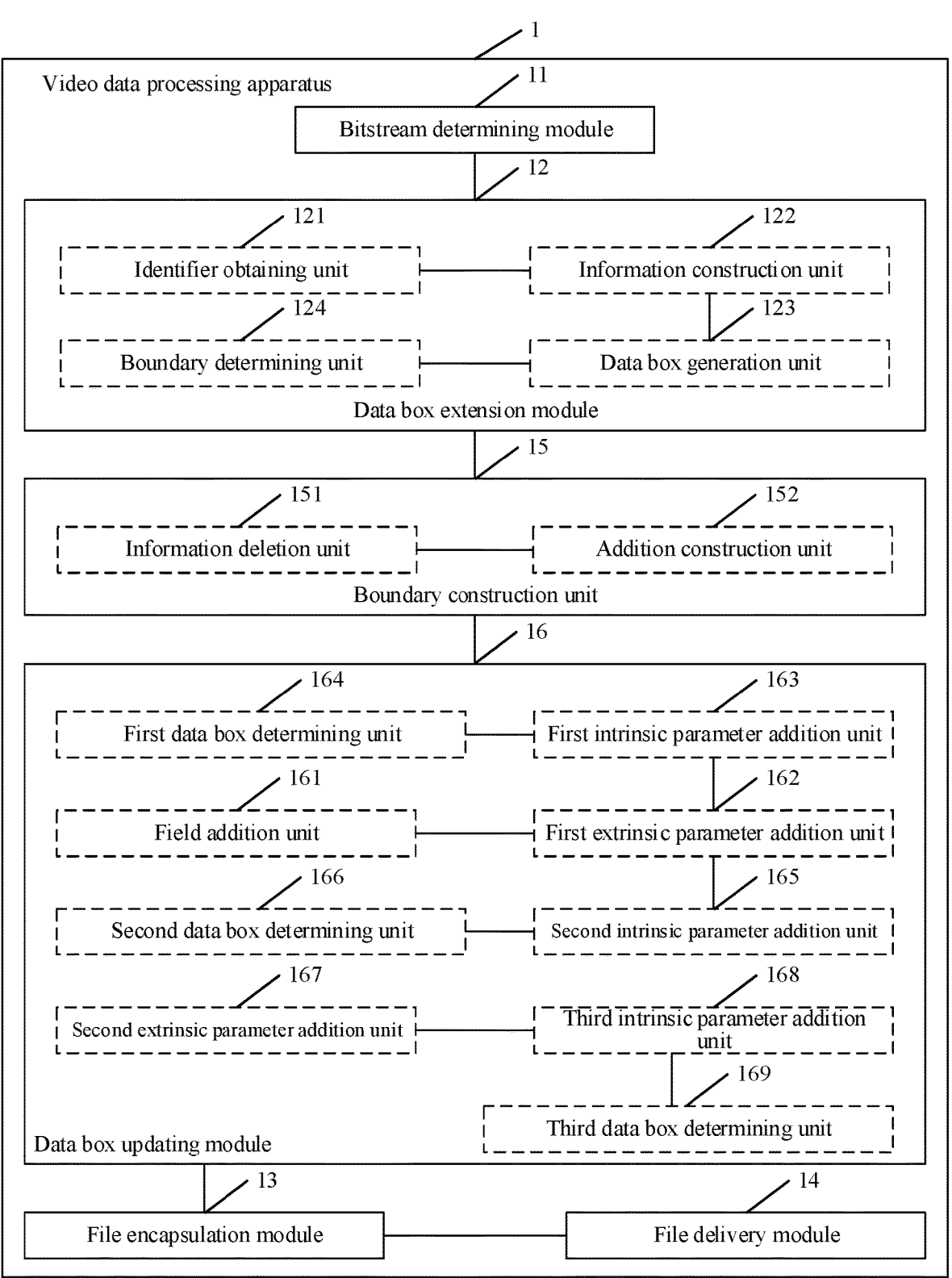
FIG. 10 is a schematic structural diagram of a video data processing apparatus according to an embodiment of this disclosure.

Referring to FIG. 10, FIG. 10 is a schematic structural diagram of a video data processing apparatus according to an embodiment of this disclosure. The video data processing apparatus may be a computer program (including program code) running on an encoding device. For example, the video data processing apparatus is application software in the encoding device. The video data processing apparatus may be configured to perform the step of the video data processing method in the embodiment corresponding to FIG. 7. As shown in FIG. 10, the video data processing apparatus 1 may include: a bitstream determining module 11, a data box extension module 12, a file encapsulation module 13, a file delivery module 14, a boundary construction module 15, and a data box updating module 16.

The bitstream determining module 11 is configured to determine, based on a spliced texture map and depth map, an encoded video bitstream for constructing a free-view video; the spliced texture map and depth map being obtained by using multiple images collected by an ith camera in a camera array, and the camera array including N cameras; and i being a positive integer less than or equal to N; and the data box extension module 12 is configured to: obtain boundary metadata information used for indicating a scene boundary of the free-view video, and add the boundary metadata information to a file encapsulation data box corresponding to the free-view video, to obtain an extended data box corresponding to the file encapsulation data box; the camera array including M boundary cameras; M being a field value of a boundary camera count field associated with the boundary camera; the boundary camera count field being used for indicating a quantity of boundary cameras that constitute the scene boundary of the free-view video; and M being a positive integer less than or equal to N; and the data box extension module 12 may include: an identifier obtaining unit 121, an information construction unit 122, a data box generation unit 123, and a boundary determining unit 124. The identifier obtaining unit 121 is configured to obtain a camera identifier of a jth boundary camera in the M boundary cameras; j being a positive integer less than or equal to M; and the camera identifier of the jth boundary camera being used for indicating the following information: a service object associated with the free-view video rendering a content region range photographed by the jth boundary camera; the information construction unit 122 is configured to construct camera parameter field information, cross-boundary processing field information, and boundary range field information of a scene boundary of the jth boundary camera;

the data box generation unit 123 is configured to obtain a boundary information data box corresponding to the scene boundary based on the constructed camera parameter field information, the cross-boundary processing field information, and the boundary range field information; the cross-boundary processing field information being used for indicating a processing manner in a case that an object behavior of the service object exceeds the scene boundary; and the boundary range field information being used for indicating a rendering region range in a case of rendering the scene boundary; the boundary determining unit 124 is configured to: when a field value of the boundary range field information is a first range field value, determine, based on the content region range photographed by the jth boundary camera, a first scene boundary corresponding to the rendering region range, and use, as boundary metadata information used for indicating the first scene boundary of the free-view video, information that is carried in the boundary information data box and that is associated with the first scene boundary.

In some embodiments, the camera parameter field information of the jth boundary camera includes a boundary camera extrinsic parameter and a boundary camera intrinsic parameter of the jth boundary camera; the boundary camera extrinsic parameter includes position information and orientation information of the jth boundary camera in a global reference coordinate system; the boundary camera intrinsic parameter includes a camera identifier corresponding to the jth boundary camera, a camera type field, photographing range field information, and camera depth field information;

The camera type field is used for indicating an attribute type of the jth boundary camera; the photographing range field information is used for indicating the content region range photographed by the jth boundary camera, and the content region range photographed by the jth boundary camera is associated with the attribute type of the jth boundary camera; and the camera depth field information is used for indicating depth information indicated by a visual cone associated with the jth boundary camera.

In some embodiments, the boundary camera intrinsic parameter is determined by a first intrinsic parameter construction policy indicated by a parameter derivation field of the jth boundary camera; the first intrinsic parameter construction policy includes a first intrinsic parameter modification policy in a case that a field value of the parameter derivation field is a first derivation field value, and a second intrinsic parameter modification policy in a case that the field value of the parameter derivation field is a second derivation field value; the first intrinsic parameter modification policy is used for indicating that the jth boundary camera and a remaining boundary camera have different camera intrinsic parameters; the remaining boundary camera is a boundary camera other than the jth boundary camera in the M boundary cameras; and the second intrinsic parameter modification policy is used for indicating that the jth boundary camera and the remaining boundary camera have the same camera intrinsic parameters except the camera identifier.

In some embodiments, the boundary camera intrinsic parameter is determined by a second intrinsic parameter construction policy indicated by a camera type field of the jth boundary camera; the attribute type represented by the camera type field of the jth boundary camera includes a projection type and a model type that are corresponding to the jth boundary camera; in a case that a field value of the camera type field is a first attribute type field value, a camera type field that has the first attribute type field value is used for indicating that the projection type corresponding to the jth boundary camera is an isometric columnar projection type; in a case that the field value of the camera type field is a second attribute type field value, a camera type field that has the second attribute type field value is used for indicating that the projection type corresponding to the jth boundary camera is a perspective projection type; in a case that the field value of the camera type field is a third attribute type field value, a camera type field with the third attribute type field value is used for indicating that the projection type corresponding to the jth boundary camera is an orthogonal projection type; in a case that the field value of the camera type field is a fourth attribute type field value, a camera type field that has the fourth attribute type field value is used for indicating that the model type corresponding to the jth boundary camera is a pinhole camera model type; and in a case that the field value of the camera type field is a fifth attribute type field value, a camera type field that has the fifth attribute type field value is used for indicating that the model type corresponding to the jth boundary camera is a fish-eye camera model type.

In some embodiments, when the model type corresponding to the jth boundary camera is the foregoing pinhole camera model type, photographing range field information corresponding to a jth boundary camera that has the pinhole camera model type includes a camera focal length of the jth boundary camera and an offset of a principal optical axis of the jth boundary camera in an image coordinate system; the camera focal length includes a first focal length component value and a second focal length component value; and the offset includes a first offset component value and a second offset component value.

In some embodiments, when the model type corresponding to the jth boundary camera is the fish-eye camera model type, the photographing range field information corresponding to the jth boundary camera that has the fish-eye camera model type includes an offset of a principal optical axis of the jth boundary camera in an image coordinate system.

The file encapsulation module 13 is configured to perform encapsulation processing on the encoded video bitstream based on the extended data box to obtain a video media file of the free-view video; the file delivery module 14 is configured to deliver the video media file to a video client, so that in a case that the extended data box is obtained based on the video media file, the video client obtains the spliced texture map and depth map associated with the ith camera, and in a case of determining that the ith camera is a boundary camera, render, on the video client, video content in the scene boundary indicated by the boundary metadata information; and the boundary constructing module 15 is configured to: construct a second scene boundary corresponding to the rendering region range in a case that the field value of the boundary range field information is a second range field value, and use, as boundary metadata information used for indicating the second scene boundary of the free-view video, information that is carried in the boundary information data box and that is associated with a boundary type of the second scene boundary.

In some embodiments, the boundary construction module 15 may include: an information deletion unit 151 and an addition construction unit 152. The information deletion unit 151 is configured to perform deletion processing on initial size information in initial boundary field information based on a boundary construction policy in a case that the field value of the boundary range field information is the second range field value; the addition construction unit 152 is configured to: add a boundary type field, a scene origin field, and a construction field information used for indicating the rendering region range to the initial boundary field information after the initial size information is deleted, so as to obtain updated boundary field information corresponding to the initial boundary field information, and construct the second scene boundary corresponding to the rendering region range based on the updated boundary field information; the boundary type field being used for indicating the boundary type of the second scene boundary; the boundary type including a hexahedron type, a sphere type, a cylinder type, and a hemispherical type; and the scene origin field being used for indicating a scene origin of the second scene boundary.

In some embodiments, in a case that a field value of the scene origin field is a first origin field value, a key position point that is in a three-dimensional Cartesian coordinate system and that is associated with the boundary type of the second scene boundary is used as the scene origin of the second scene boundary; and in a case that the field value of the scene origin field is a second origin field value, a default position point in the three-dimensional Cartesian coordinate system is used as the scene origin of the second scene boundary. In a case that a field value of the boundary type field is a first boundary type field value, a boundary type field that has the first boundary type field value is used for indicating that the boundary type of the second scene boundary is the hexahedron type, and the second scene boundary is determined as a hexahedron; construction field information corresponding to the hexahedron includes size information of the hexahedron; and a key position point corresponding to the hexahedron is a target vertex on a bottom surface of the hexahedron. In a case that a field value of the boundary type field is a second boundary type field value, a boundary type field that has the second boundary type field value is used for indicating that the boundary type of the second scene boundary is the sphere type, and the second scene boundary is determined as a sphere; construction field information corresponding to the sphere includes radius information of the sphere obtained after deletion processing is performed on initial sphere center information of the sphere; and a key position point corresponding to the sphere is a sphere center of the sphere. In a case that a field value of the boundary type field is a third boundary type field value, a boundary type field that has the third boundary type field value is used for indicating that the boundary type of the second scene boundary is the cylinder type, and the second scene boundary is determined as a cylinder; construction field information corresponding to the cylinder includes size information of the cylinder; the size information of the cylinder includes a radius of the cylinder in a first coordinate dimension, a radius of the cylinder in a second coordinate dimension, and height information of the cylinder in a third coordinate dimension; and a key position point corresponding to the cylinder is a center of a bottom surface of the cylinder. In a case that a field value of the boundary type field is a fourth boundary type field value, a boundary type field that has the fourth boundary type field value is used for indicating that the boundary type of the second scene boundary is the hemispherical type, and the second scene boundary is determined as a hemispherical body; construction field information corresponding to the hemispherical body includes a plane normal vector corresponding to the hemispherical body and size information corresponding to the hemispherical body; and a key position point corresponding to the hemispherical body is a center of a bottom surface of the hemispherical body.

In some embodiments, the cross-boundary processing field information of the jth boundary camera includes a cross-boundary attribute field; when the field value of the cross-boundary attribute field is a first attribute field value, a cross-boundary attribute field that has the first attribute field value is used for indicating that video content in a first virtual window region is to be displayed for the service object on the video client when the video content associated with the object behavior of the service object exceeds the rendering region; and the first virtual window region is a window region corresponding to a first virtual camera, the first virtual camera is located at a scene origin of the scene boundary, and an orientation of the first virtual camera is a default orientation.

In some embodiments, when the field value of the cross-boundary attribute field is a second attribute field value, a cross-boundary attribute field that has the second attribute field value is used for indicating that when the video content associated with the object behavior of the service object exceeds the rendering region range, video content in a content region range corresponding to a target camera indicated by a target camera identifier is to be displayed on the video client for the service object; and the target camera belongs to the camera array. When the field value of the cross-boundary attribute field is a third attribute field value, a cross-boundary attribute field that has the third attribute field value is used for indicating that video content in a second virtual window region is to be displayed for the service object on the video client when the video content associated with the object behavior of the service object exceeds the rendering region; and the second virtual window region is a window region corresponding to a second virtual camera, and position information and orientation information of the second virtual camera are designated by using a virtual camera designation policy.

In some embodiments, the cross-boundary processing field information of the jth boundary camera is determined by a cross-boundary construction policy; the cross-boundary construction policy includes a first cross-boundary construction policy and a second cross-boundary construction policy; the first cross-boundary construction policy is used for indicating that the jth boundary camera and a remaining boundary camera have different cross-boundary processing field information; the remaining boundary camera is a boundary camera other than the jth boundary camera in the M boundary cameras; and the second cross-boundary construction policy is used for indicating that the jth boundary camera and the remaining boundary camera have the same cross-boundary processing field information.

In some embodiments, the extended data box further includes an updated free view information data box corresponding to the free-view video; and the data box updating module 16 is configured to perform deletion processing on a model type field carried in an initial free-view information data box corresponding to the free-view video, and camera position information and camera focal length information that are separately corresponding to each camera in the camera array; and separately add a camera extrinsic parameter and a camera intrinsic parameter to each camera in the initial free-view information data box obtained after deletion processing, to obtain the updated free-view information data box, and use information carried in the updated free-view information data box as free-view metadata information used for indicating a view included in a track of the free-view video.

In some embodiments, the updated free-view information data box is determined by a first data box construction policy indicated by a camera parameter duplication field; and the data box updating module 16 may include: a field addition unit 161, a first extrinsic parameter addition unit 162, a first intrinsic parameter addition unit 163, a first data box determining unit 164, a second intrinsic parameter addition unit 165, and a second data box determining unit 166. The field addition unit 161 is configured to add the camera parameter duplication field to the initial free-view information data box obtained after deletion processing; the first extrinsic parameter addition unit 162 is configured to add a first camera extrinsic parameter to the ith camera in the camera array, and add a second camera extrinsic parameter to a kth camera in the camera array; k being a positive integer less than or equal to N; the first intrinsic parameter addition unit 163 is configured to determine, in a case that a field value of the camera parameter duplication field is a first duplication field value, that the first data box construction policy includes a first data box modification policy, add a first camera intrinsic parameter to the ith camera based on the first data box modification policy, and add a second camera intrinsic parameter to the kth camera; the first camera intrinsic parameter and the second camera intrinsic parameter including the same parameter information except the camera identifier; and both the first camera intrinsic parameter and the second camera intrinsic parameter being determined by a second intrinsic parameter construction policy; and the first data box determining unit 164 is configured to obtain the updated free-view information data box based on the added first camera extrinsic parameter, the added second camera extrinsic parameter, the added first camera intrinsic parameter, and the added second camera intrinsic parameter. The second intrinsic parameter addition unit 165 is configured to determine, in a case that the field value of the camera parameter duplication field is a second duplication field value, that the first data box construction policy includes a second data box modification policy, add a third camera intrinsic parameter to the ith camera based on the second data box modification policy, and add a fourth camera intrinsic parameter to the kth camera; the third camera intrinsic parameter and the fourth camera intrinsic parameter including different parameter information; and both the third camera intrinsic parameter and the fourth camera intrinsic parameter being determined by a second intrinsic parameter construction policy; and the second data box determining unit 166 is configured to obtain the updated free-view information data box based on the added first camera extrinsic parameter, the added second camera extrinsic parameter, the added third camera intrinsic parameter, and the added fourth camera intrinsic parameter.

In some embodiments, the updated free-view information data box is determined by a second data box construction policy; and the data box updating module 16 may include: a second extrinsic parameter addition unit 167, a third intrinsic parameter addition unit 168, and a third data box determining unit 169. The second extrinsic parameter addition unit 167 is configured to add, based on the second data box construction policy, a third camera extrinsic parameter to the ith camera in the camera array and a fourth camera extrinsic parameter to a kth camera in the camera array in the initial free-view information data box obtained after deletion processing; k being a positive integer less than or equal to N; the third intrinsic parameter addition unit 168 is configured to add a fifth camera intrinsic parameter to the ith camera, and add a sixth camera intrinsic parameter to the kth camera; both the fifth camera intrinsic parameter and the sixth camera intrinsic parameter being determined by a first intrinsic parameter construction policy; and the third data box determining unit 169 is configured to obtain the updated free-view information data box based on the added third camera extrinsic parameter, the added fourth camera extrinsic parameter, the added fifth camera intrinsic parameter, and the added sixth camera intrinsic parameter.

Figure 11:
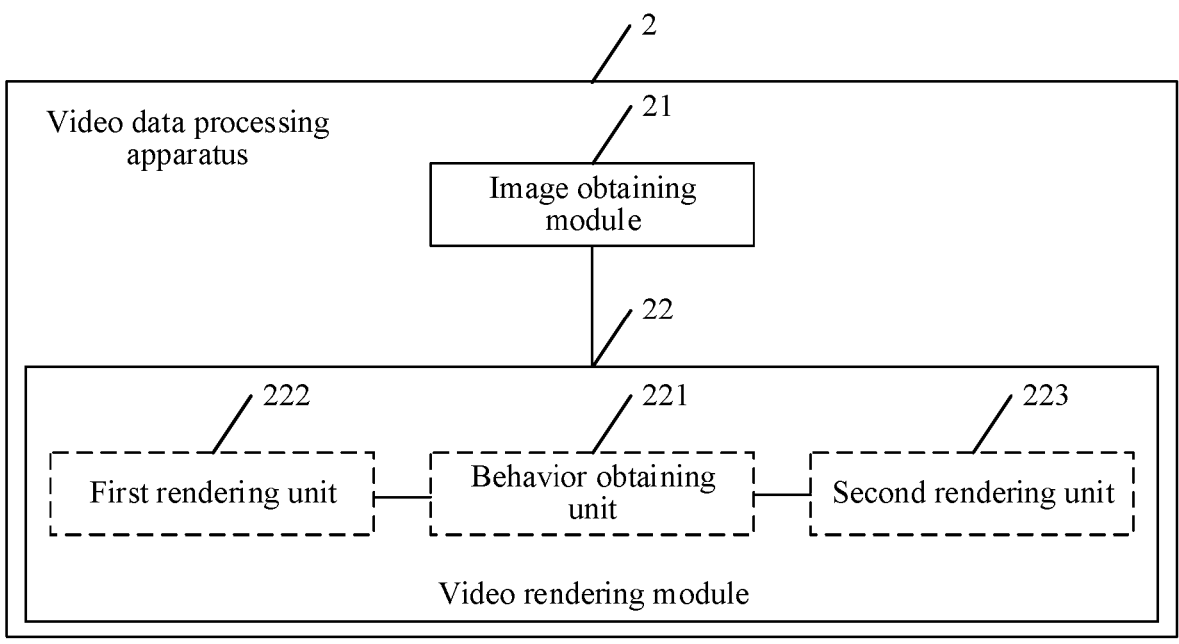
FIG. 11 is a schematic structural diagram of another video data processing apparatus according to an embodiment of this disclosure.

Referring to FIG. 11, FIG. 11 is a schematic structural diagram of another video data processing apparatus according to an embodiment of this disclosure. The video data processing apparatus may be a computer program (including program code) running on a decoding device. For example, the video data processing apparatus is application software in the decoding device. The video data processing apparatus may be configured to perform the step of the video data processing method in the embodiment corresponding to FIG. 8. As shown in FIG. 11, the video data processing apparatus 2 may include: an image obtaining module 21 and a video rendering module 22; the image obtaining module 21 is configured to: obtain, in a case that a video media file of a free-view video delivered by a server is obtained, an extended data box based on the video media file, and obtain a spliced texture map and depth map that are associated with an ith camera in a camera array; the video media file being obtained by the server by performing encapsulation processing on an encoded video bitstream based on the extended data box; the extended data box being obtained by the server by adding, to a file encapsulation data box corresponding to the free-view video, obtained boundary metadata information that is used for indicating a scene boundary of the free-view video; the encoded video bitstream being a bitstream that is determined by the server based on the image spliced texture map and depth map and used for constructing the free-view video; the spliced texture map and depth map being obtained by using multiple images collected by an ith camera, and the camera array including N cameras; and i being a positive integer less than or equal to N; and the video rendering module 22 is configured to: render, on the video client in a case of determining that the ith camera is a boundary camera, video content in the scene boundary indicated by the boundary metadata information; where the scene boundary includes a first scene boundary and a second scene boundary; the first scene boundary is determined based on a content region range photographed by each boundary camera in the camera array; the second scene boundary is determined based on a boundary construction policy; a region range corresponding to the second scene boundary is greater than a region range corresponding to the first scene boundary; and the region range corresponding to the second scene boundary refers to a rendering region range at the time of rendering the second scene boundary.

In some embodiments, the video rendering module 22 may include: a behavior obtaining unit 221, a first rendering unit 222, and a second rendering unit 223. The behavior obtaining unit 221 is configured to obtain an object behavior of a service object associated with the free-view video in a case of determining that the ith camera is a boundary camera; the first rendering unit 222 is configured to render, on the video client based on the spliced texture map and depth map in a case that video content associated with the object behavior exceeds a content region range photographed by the ith camera and does not exceed the rendering region range, video content in the content region range photographed by the ith camera; and the second rendering unit 223 is configured to obtain cross-boundary processing field information of the ith camera from the boundary metadata information in a case that the video content associated with the object behavior exceeds the rendering region range, and render, on the video client, video content associated with the cross-boundary processing field information.

Figures 12, 13:
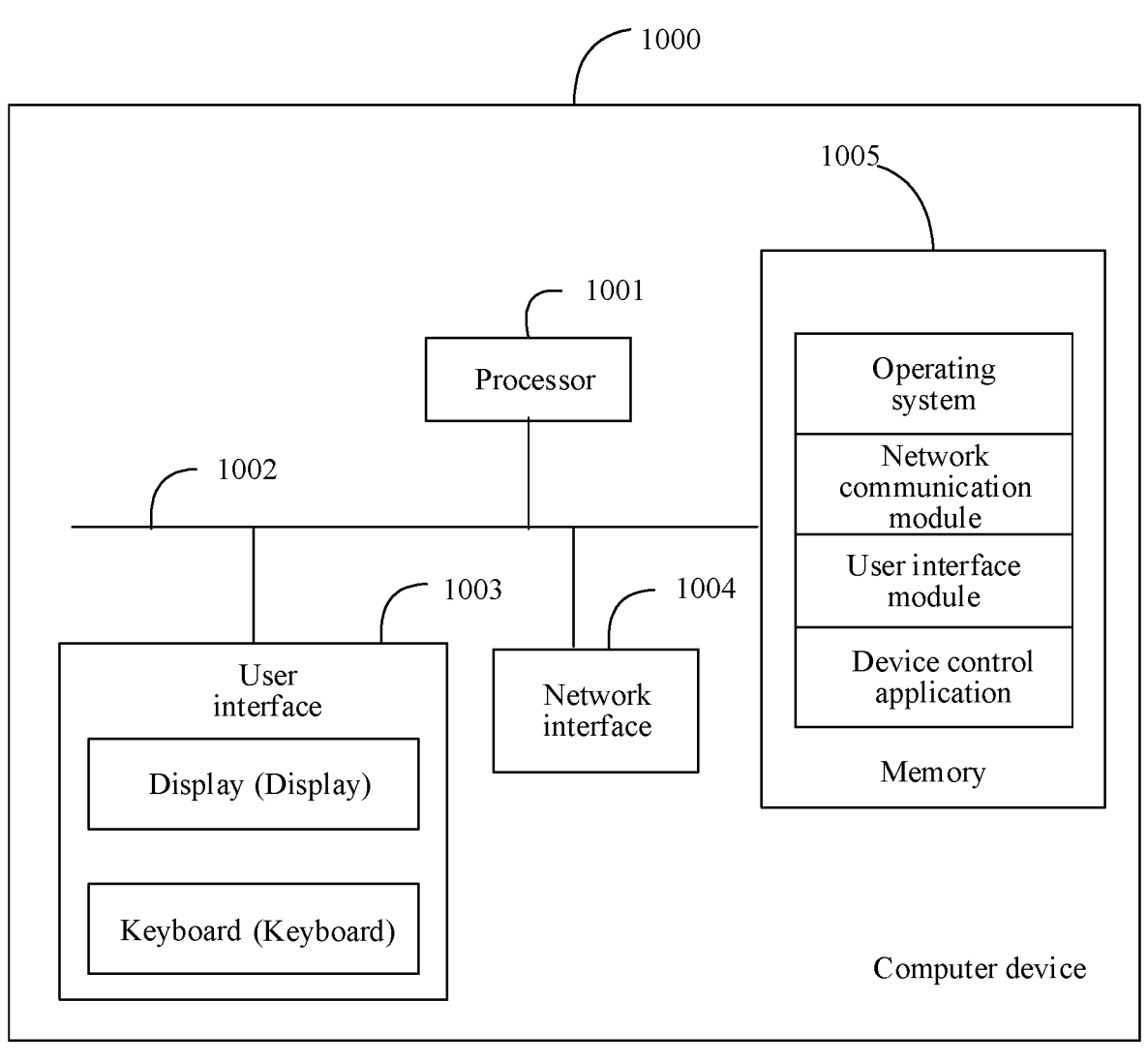
FIG. 12 is a schematic structural diagram of a computer device according to an embodiment of this disclosure.
FIG. 13 is a schematic structural diagram of a video data processing system according to an embodiment of this disclosure.

Referring to FIG. 12, FIG. 12 is a schematic structural diagram of a computer device according to an embodiment of this disclosure. As shown in FIG. 12, the computer device 1000 may include: a processor 1001 (processing circuitry), a network interface 1004, and a memory 1005. In addition, the foregoing computer device 1000 may further include: a user interface 1003 and at least one communication bus 1002. The communication bus 1002 is configured to implement connection and communication between the components. The user interface 1003 may include a display and a keyboard. The user interface 1003 may further include a standard wired interface and wireless interface. The network interface 1004 may include a standard wired interface and wireless interface (for example, a Wi-Fi interface). The memory 1005 may be a high-speed RAM memory, or may be a non-volatile memory, for example, at least one magnetic disk memory. The memory 1005 may be at least one storage apparatus that is located far away from the foregoing processor 1001. As shown in FIG. 12, the memory 1005 used as a non-transitory computer readable storage medium may include an operating system, a network communication module, a user interface module, and a device-control application program. The term "processing circuitry" is used herein to include one or more processors and the term "non-transitory computer readable storage medium" is used herein to include one or more memories or memory structures.

In the computer device 1000 shown in FIG. 12, the network interface 1004 may provide a network communication function. The user interface 1003 is configured to provide an input interface for a user. The processor 1001 is configured to invoke a device-control application program stored in the memory 1005 to execute the foregoing descriptions of the video data processing method in any one of the embodiments corresponding to FIG. 7, FIG. 8, and FIG. 9. In addition, the description of beneficial effects of the same method is not described herein again.

An embodiment of this disclosure further provides a computer readable storage medium, where the computer readable storage medium stores a computer program executed by the foregoing video data processing apparatus 1 and the foregoing video data processing apparatus 2, and the computer program includes program instructions. When a processor executes the program instructions, descriptions of the video data processing method in the foregoing embodiments corresponding to any one of FIG. 7, FIG. 8, or FIG. 9 can be executed. Therefore, details are not described herein again. In addition, the description of beneficial effects of the same method is not described herein again. For technical details that are not disclosed in the computer readable storage medium embodiments of this disclosure, refer to the descriptions of the method embodiments of this disclosure.

The foregoing computer readable storage medium may be the video data processing apparatus provided in any one of the foregoing embodiments or an internal storage unit of the foregoing computer device, such as a hard disk or a memory of the computer device. The computer readable storage medium may also be an external storage device of the computer device, for example, a plug type hard disk, a smart media card (SMC), a secure digital (SD) card, and a flash card that are configured on the computer device. In some embodiments, the computer readable storage medium may further include an internal storage unit of the computer device and an external storage device. The computer readable storage medium is configured to store the computer program and other programs and data required by the computer device. The computer readable storage medium may be further configured to temporarily store data that has been or is to be output.

In addition, an embodiment of this disclosure further provides a computer program product, where the computer program product includes a computer program, and the computer program is stored in a computer readable storage medium. A processor of a computer device reads the computer program from the computer readable storage medium, and the processor executes the computer program, so that the computer device executes the method provided in any one of the foregoing embodiments in FIG. 7, FIG. 8, and FIG. 9. For technical details related to the computer program product or the computer program embodiment in this disclosure, refer to the description in the method embodiment of this disclosure.

In some embodiments, referring to FIG. 13, FIG. 13 is a schematic structural diagram of a video data processing system according to an embodiment of this disclosure. The video data processing system 3 may include a video data processing apparatus 1a and a video data processing apparatus 2a. The video data processing apparatus 1a may be the video data processing apparatus 1 in the foregoing embodiment corresponding to FIG. 10. It may be understood that the video data processing apparatus 1a may be integrated into the encoding device 200A in the foregoing embodiment corresponding to FIG. 2. The video data processing apparatus 2a may be the video data processing apparatus 2 in the foregoing embodiment corresponding to FIG. 11. It may be understood that the video data processing apparatus 2a may be integrated into the decoding device 200B in the foregoing embodiment corresponding to FIG. 2. In addition, the description of beneficial effects of the same method is not described herein again. For technical details not disclosed in the embodiments of the video data processing system related to this disclosure, refer to the descriptions in the embodiments of the method in this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A video data processing method, comprising:

generating, based on a spliced texture map and a depth map, an encoded video bitstream for constructing a free-view video, the spliced texture map and the depth map being based on multiple images collected by an ith camera in a camera array, the camera array comprising N cameras, and i being a positive integer less than or equal to N;

obtaining boundary metadata information indicating a scene boundary of the free-view video, the boundary metadata information being indicated by a boundary information data box that corresponds to the scene boundary, the boundary information data box being determined based on at least one of camera parameter information, cross-boundary processing information, and boundary range information of a jth boundary camera of M boundary cameras in the camera array, the boundary range information indicating a rendering region range for rendering the scene boundary;

adding the boundary metadata information to a file encapsulation data box corresponding to the free-view video, to obtain an extended data box;

performing encapsulation processing on the encoded video bitstream and the extended data box to obtain a video media file of the free-view video including the boundary metadata information; and delivering the video media file to a video client that is configured to determine that the ith camera is a boundary camera, and to render video content in the scene boundary indicated by the boundary metadata information.

2. The method according to claim 1, wherein the camera array comprises the M boundary cameras, M is a value of a boundary camera count field indicating a quantity of boundary cameras that constitute the scene boundary of the free-view video, where M is a positive integer less than or equal to N; and the obtaining comprises:

obtaining a camera identifier of the jth boundary camera in the M boundary cameras, j being a positive integer less than or equal to M, and the camera identifier of the jth boundary camera indicating a content region range photographed by the jth boundary camera;

determining the boundary information data box corresponding to the scene boundary based on the camera parameter information, the cross-boundary processing information, and the boundary range information of the jth boundary camera, the cross-boundary processing information indicating a processing manner when an object behavior exceeds the scene boundary; and when a value of the boundary range information is a first range value, determining a first scene boundary corresponding to the rendering region range based on the content region range photographed by the jth boundary camera.

3. The method according to claim 2, wherein the camera parameter information of the jth boundary camera comprises a boundary camera extrinsic parameter and a boundary camera intrinsic parameter of the jth boundary camera the boundary camera extrinsic parameter comprises position information and orientation information of the jth boundary camera in a global reference coordinate system, and the boundary camera intrinsic parameter comprises the camera identifier corresponding to the jth boundary camera, a camera type, photographing range information, and camera depth information; and the camera type indicates an attribute type of the jth boundary camera, the photographing range information indicates the content region range associated with the attribute type of the jth boundary camera, and the camera depth information indicates depth information indicated by a visual cone associated with the jth boundary camera.

4. The method according to claim 3, wherein the boundary camera intrinsic parameter is determined by a first intrinsic parameter construction policy indicated by a parameter derivation field of the jth boundary camera;

the first intrinsic parameter construction policy comprises a first intrinsic parameter modification policy when a value of the parameter derivation field is a first derivation field value, and a second intrinsic parameter modification policy when the value of the parameter derivation field is a second derivation field value; and the first intrinsic parameter modification policy indicates that the jth boundary camera and an other boundary camera have different camera intrinsic parameters, and the second intrinsic parameter modification policy indicates that the jth boundary camera and the other boundary camera have same camera intrinsic parameters except the camera identifier.

5. The method according to claim 3, wherein the boundary camera intrinsic parameter is determined by a second intrinsic parameter construction policy indicated by a camera type field of the jth boundary camera;

the attribute type represented by the camera type field of the jth boundary camera comprises a projection type and a model type that are corresponding to the jth boundary camera;

when a value of the camera type field is a first attribute type field value, the projection type corresponding to the jth boundary camera is an isometric columnar projection type;

when the value of the camera type field is a second attribute type field value, the projection type corresponding to the jth boundary camera is a perspective projection type;

when the value of the camera type field is a third attribute type field value, the projection type corresponding to the jth boundary camera is an orthogonal projection type;

when the value of the camera type field is a fourth attribute type field value, the model type corresponding to the jth boundary camera is a pinhole camera model type; and when the value of the camera type field is a fifth attribute type field value, the model type corresponding to the jth boundary camera is a fish-eye camera model type.

6. The method according to claim 5, wherein when the model type corresponding to the jth boundary camera is the pinhole camera model type, photographing range information corresponding to the jth boundary camera comprises a camera focal length of the jth boundary camera and an offset of a principal optical axis of the jth boundary camera in an image coordinate system; and the camera focal length comprises a first focal length component value and a second focal length component value, and the offset comprises a first offset component value and a second offset component value.

7. The method according to claim 5, wherein, when the model type corresponding to the jth boundary camera is the fish-eye camera model type, photographing range information corresponding to the jth boundary camera comprises an offset of a principal optical axis of the jth boundary camera in an image coordinate system.

8. The method according to claim 2, wherein the scene boundary of the free-view video further comprises a second scene boundary; and the obtaining comprises:

when the value of the boundary range information is a second range field value, determining the second scene boundary corresponding to the rendering region range and determining, as boundary metadata information indicating the second scene boundary of the free-view video, information included in the boundary information data box that is associated with a boundary type of the second scene boundary.

9. The method according to claim 8, wherein the determining the second scene boundary comprises:

performing deletion processing on initial size information in initial boundary information based on a boundary construction policy when the value of the boundary range information is the second range field value;

adding a boundary type field, a scene origin field, and construction information indicating the rendering region range to the initial boundary information obtained after the initial size information is deleted, to obtain updated boundary information corresponding to the initial boundary information; and constructing the second scene boundary corresponding to the rendering region range based on the updated boundary information, the boundary type field indicating the boundary type being one of a hexahedron type, a sphere type, a cylinder type, or a hemispherical type, and the scene origin field indicating a scene origin of the second scene boundary.

10. The method according to claim 9, wherein the method further comprises:

determining, when a value of the scene origin field is a first origin field value, a key position point that is in a three-dimensional Cartesian coordinate system and that is associated with the boundary type of the second scene boundary as the scene origin of the second scene boundary; and determining a default position point in the three-dimensional Cartesian coordinate system as the scene origin of the second scene boundary when the value of the scene origin field is a second origin field value.

11. The method according to claim 10, wherein when a value of the boundary type field is a first boundary type field value, the boundary type of the second scene boundary is the hexahedron type, and the second scene boundary is a hexahedron; and construction field information corresponding to the hexahedron comprises size information of the hexahedron, and the key position point corresponding to the hexahedron is a target vertex on a bottom surface of the hexahedron.

12. The method according to claim 10, wherein when a value of the boundary type field is a second boundary type field value, the boundary type of the second scene boundary is the sphere type, and the second scene boundary is a sphere; and construction field information corresponding to the sphere comprises radius information of the sphere obtained after the deletion processing is performed on initial sphere center information of the sphere, and the key position point corresponding to the sphere is a sphere center of the sphere.

13. The method according to claim 10, wherein when a value of the boundary type field is a third boundary type field value, the boundary type of the second scene boundary is the cylinder type, and the second scene boundary is a cylinder; and construction field information corresponding to the cylinder comprises size information of the cylinder including a radius of the cylinder in a first coordinate dimension, a radius of the cylinder in a second coordinate dimension, and height information of the cylinder in a third coordinate dimension, and the key position point corresponding to the cylinder is a center of a bottom surface of the cylinder.

14. The method according to claim 10, wherein when a value of the boundary type field is a fourth boundary type field value, the boundary type of the second scene boundary is the hemispherical type, and the second scene boundary is a hemispherical body; and construction field information corresponding to the hemispherical body comprises a plane normal vector corresponding to the hemispherical body and size information corresponding to the hemispherical body, and the key position point corresponding to the hemispherical body is a center of a bottom surface of the hemispherical body.

15. The method according to claim 2, wherein the cross-boundary processing information of the jth boundary camera comprises a cross-boundary attribute field; and when a value of the cross-boundary attribute field is a first attribute field value, the processing manner when the object behavior exceeds the scene boundary comprises displaying the video content in a first virtual window region on the video client, the first virtual window region is a window region corresponding to a first virtual camera, the first virtual camera is located at a scene origin of the scene boundary, and an orientation of the first virtual camera is a default orientation.

16. The method according to claim 15, wherein, when a value of the cross-boundary attribute field is a second attribute field value, the processing manner when the object behavior exceeds the scene boundary comprises displaying, on the video client, the video content in the content region range corresponding to a target camera indicated by a target camera identifier; and the target camera belongs to the camera array.

17. The method according to claim 15, wherein, when a value of the cross-boundary attribute field is a third attribute field value, the processing manner when the object behavior exceeds the scene boundary comprises displaying the video content in a second virtual window region on the video client, and the second virtual window region is a window region corresponding to a second virtual camera, position information and orientation information of the second virtual camera are designated by using a virtual camera designation policy.

18. The method according to claim 15, wherein the cross-boundary processing information of the jth boundary camera is determined by a cross-boundary construction policy that is a first cross-boundary construction policy or a second cross-boundary construction policy, the first cross-boundary construction policy indicating that the jth boundary camera and an other boundary camera have different cross-boundary processing information, and the second cross-boundary construction policy indicating that the jth boundary camera and the other boundary camera have same cross-boundary processing field information.

19. An apparatus for data processing, the apparatus comprising:

processing circuitry configured to generate, based on a spliced texture map and a depth map, an encoded video bitstream for constructing a free-view video, the spliced texture map and the depth map being based on multiple images collected by an ith camera in a camera array, the camera array comprising N cameras, and i being a positive integer less than or equal to N;

obtain boundary metadata information indicating a scene boundary of the free-view video, the boundary metadata information being indicated by a boundary information data box that corresponds to the scene boundary, the boundary information data box being determined based on at least one of camera parameter information, cross-boundary processing information, and boundary range information of a jth boundary camera of M boundary cameras in the camera array, the boundary range information indicating a rendering region range for rendering the scene boundary;

add the boundary metadata information to a file encapsulation data box corresponding to the free-view video, to obtain an extended data box;

perform encapsulation processing on the encoded video bitstream and the extended data box to obtain a video media file of the free-view video including the boundary metadata information; and deliver the video media file to a video client that is configured to determine that the ith camera is a boundary camera, and to render video content in the scene boundary indicated by the boundary metadata information.

20. A non-transitory computer-readable storage medium storing computer-readable instructions thereon, which, when executed by processing circuitry, cause the processing circuitry to perform a video data processing method comprising:

generating, based on a spliced texture map and a depth map, an encoded video bitstream for constructing a free-view video, the spliced texture map and the depth map being based on multiple images collected by an ith camera in a camera array, the camera array comprising N cameras, and i being a positive integer less than or equal to N;

obtaining boundary metadata information indicating a scene boundary of the free-view video, the boundary metadata information being indicated by a boundary information data box that corresponds to the scene boundary, the boundary information data box being determined based on at least one of camera parameter information, cross-boundary processing information, and boundary range information of a jth boundary camera of M boundary cameras in the camera array, the boundary range information indicating a rendering region range for rendering the scene boundary;

adding the boundary metadata information to a file encapsulation data box corresponding to the free-view video, to obtain an extended data box;

performing encapsulation processing on the encoded video bitstream and the extended data box to obtain a video media file of the free-view video including the boundary metadata information; and delivering the video media file to a video client that is configured to determine that the ith camera is a boundary camera, and to render video content in the scene boundary indicated by the boundary metadata information.

* * * * *